(12) United States Patent
Kanamoto et al.

(10) Patent No.: US 6,973,274 B2
(45) Date of Patent: Dec. 6, 2005

(54) IMAGE PROCESSING APPARATUS, IMAGE PROCESSING METHOD, JOB PROCESSING METHOD, PROGRAM, AND STORAGE MEDIUM

(75) Inventors: Yoshiji Kanamoto, Ohta-ku (JP); Nobuaki Miyahara, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 10/680,866

(22) Filed: Oct. 6, 2003

(65) Prior Publication Data

US 2004/0126122 A1 Jul. 1, 2004

(30) Foreign Application Priority Data

Oct. 15, 2002 (JP) .............................. 2002-299742

(51) Int. Cl.$^7$ ...................... G03G 15/00; G03G 15/22
(52) U.S. Cl. ............................ 399/20; 399/10; 399/16
(58) Field of Search ............................... 399/20, 10, 16

(56) References Cited

U.S. PATENT DOCUMENTS

| | | | | |
|---|---|---|---|---|
| 4,202,996 A | * | 5/1980 | Hilfman | ..................... 585/377 |
| 4,782,367 A | * | 11/1988 | Noguchi | ........................ 355/40 |
| 4,963,932 A | * | 10/1990 | Horvath | ....................... 399/185 |
| 4,982,234 A | * | 1/1991 | Filion et al. | ................... 399/81 |
| 5,081,699 A | * | 1/1992 | Filion et al. | ................. 715/525 |
| 5,465,160 A | * | 11/1995 | Kamo et al. | ................. 358/401 |
| 5,500,717 A | * | 3/1996 | Altrieth, III | ................. 399/83 |
| 5,740,496 A | * | 4/1998 | Kawabuchi et al. | ........... 399/83 |
| 6,356,721 B1 | * | 3/2002 | Motoyoshi et al. | ............ 399/82 |
| 6,415,116 B2 | * | 7/2002 | Sumiyama et al. | ............ 399/82 |
| 6,621,993 B2 | * | 9/2003 | Tamai et al. | ................... 399/82 |
| 6,661,978 B2 | * | 12/2003 | Brewington | ................. 399/19 |

* cited by examiner

*Primary Examiner*—Ren Yan
*Assistant Examiner*—Marvin P. Crenshaw
(74) *Attorney, Agent, or Firm*—Canon U.S.A. Inc. I.P. Divison

(57) ABSTRACT

Page numbers on original document volumes that have been read are deleted from the read image information as a part of image processing, and page information sorted with the original document pages of multiple read original document volumes as a single document is superimposed onto the image information from which the page numbers have been deleted, following which the pages are printed out. The pages are thus provided with serial page numbers according to the sorting thereof, and situations wherein both original and new page numbers are present on the pages can be avoided.

2 Claims, 21 Drawing Sheets

FIG. 25

FIRST DATA PROCESSING PROGRAM
PROGRAM CODE GROUP CORRESPONDING TO STEPS
IN FLOWCHART SHOWN IN FIG. 9

SECOND DATA PROCESSING PROGRAM
PROGRAM CODE GROUP CORRESPONDING TO STEPS
IN FLOWCHART SHOWN IN FIG. 15

THIRD DATA PROCESSING PROGRAM
PROGRAM CODE GROUP CORRESPONDING TO STEPS
IN FLOWCHART SHOWN IN FIG. 24

IMAGE PROCESSING APPARATUS, IMAGE PROCESSING METHOD, JOB PROCESSING METHOD, PROGRAM, AND STORAGE MEDIUM

BACKGROUND OF THE INVENTION

1. Field of the Invention

The present invention relates to an image processing apparatus, an image processing method, a job processing method, a program, and a storage medium, suitable for performing processing related to page number information.

2. Description of the Related Art

Conventionally, digital photocopiers have been known which have functions for temporarily storing in memory image data read out from a scanner unit or the bitmap image data converted from PDL data transmitted from a host computer through a network, and reading out any of the stored original document image data from the memory so as to repetitively perform printout.

Furthermore, proposals are being made with regard to the aforementioned digital photocopiers, which can be connected to a finisher having finishing functions of stapling, hole-punching, folding, bookbinding, or the like, further having box functions wherein the settings data for finishing processing, the layout of the images such as double-side printing and the like, are stored in the memory as job information at the same time of storage of the image so as to perform printout based upon the job information regardless of the timing of image input.

Furthermore, while the individual functions in multi-function apparatuses such as scanning, printout, facsimile, and the like, are becoming increasingly advanced, there are also demands of the aforementioned apparatuses to easily assemble multiple documents formed of multiple sources read out with the aforementioned scanning functions, into a single document booklet (composed booklet).

Furthermore, there is demand for the aforementioned apparatuses to print out the document booklet composed by the aforementioned printing functions with a serial number superimposed thereupon.

On the other hand, with the above-described box function, box-joining printing functions for printing selected multiple documents as a single document according to settings such as finishing processing, the layout of images such as double-side printing or the like, and so forth, are being studied.

This function enables multiple different documents to be collected to form a single document, and furthermore, the order of the documents or the like can be changed whenever suitable, and accordingly it is hoped that output of documents can be made in a freer format.

Furthermore, proposals are being made with regard to the digital photocopiers including an inserting sheets function and a page-printing function.

Here, "inserting sheets function" means a function for inserting a special paper sheet such as a colored paper sheet between regular paper sheets in order to section the document.

Note that an arrangement may be made wherein a regular paper sheet is be used as an inserted paper sheet, or an arrangement may be made wherein images from an original document are printed out on the inserted paper sheet.

Furthermore, "page-printing function" means a function for automatically printing page numbers at the time of outputting a scanned image, for example, and more specifically, a function for printing the page numbers such as "-1-, -2-, . . . ", which are automatically incremented, at desired positions on the sheet.

However, in many cases, each document which is to be composed has original page numbers printed on header portions or footer portions of the original document in an individual format, and accordingly, printing of the new page numbers on the composed document might cause a problem because the original page number which has been printed prior to reading-out and the new page number on the paper sheet both exist on the same sheet.

With such a composed booklet, the original page numbers are useless information and the new page numbers following composition of the documents are necessary information, and the present of both not only leads to poor appearance, but also leads to a problem in that the user might become confused.

SUMMARY OF THE INVENTION

It is an object of the present invention to provide an image processing apparatus, image processing method and job processing method, and program and storage medium and the like thereof, to solve the above-described problems.

It is another object of the present invention to provide an image processing apparatus, image processing method and job processing method, and program and storage medium and the like thereof, capable of assigning sorted page numbers to an assembled document which is assembled from original document volumes and output, while avoiding a situation wherein both original page numbers and newly-assigned page numbers exist on the pages.

It is yet another object of the present invention to provide an image processing apparatus, image processing method and job processing method, and program and storage medium and the like thereof, wherein the ease-of-reading of page numbers in an assembled document created from multiple original document volumes is markedly improved.

It is a further object of the present invention to provide an image processing apparatus, image processing method and job processing method, and program and storage medium and the like thereof, wherein page information can be accurately assigned to jobs using box functions, thereby handling a wide variety of user demands regarding processing of page numbers.

In order to achieve the above objects, according to a first aspect of the present invention, an image processing apparatus, having reading means for reading individual original documents in a volume contained in original document data, for performing image processing on image information read by the reading means, comprises: deleting means for deleting page numbers, printed on the original documents in the original document volume, from image information read by the reading means; and assembling means for assembling images of page information of the individual original document pages in a plurality of original document volumes read by the reading means, into a single sorted document.

According to a second aspect of the present invention, an image processing apparatus, having reading means for reading individual original documents in an original document volume, for performing image processing on image information read by the reading means, comprises: storage means capable of storing as jobs a plurality of sets of image information made up of a plurality of pages read by the reading means; setting means for setting a joined output mode wherein jobs stored in the storage means are joined and output as one job; selecting means for selecting jobs to be joined from the plurality of jobs stored in the storage means in the event that the joined output mode has been set by the setting means; number assigning means for assigning serial numbers to be output for printing the jobs selected by the selecting means; and control means for printing each page in the jobs selected by the selecting means, with the serial numbers assigned by the number assigning means.

According to a third second aspect of the present invention, an image processing apparatus, having reading means for reading individual original document images within an original document volume, and generating means for generating image information from printing information that is input, for performing image processing on image information read by the reading means, or image information generated by the generating means, comprises: storage means capable of storing as jobs a plurality of sets of image information made up of a plurality of pages read by the reading means or image information generated by the generating means; setting means for setting a joined output mode wherein jobs stored in the storage means are joined and output as one job; selecting means for selecting jobs to be joined from the plurality of jobs stored in the storage means in the event that the joining mode has been set by the setting means; number assigning means for assigning serial numbers to be output for printing the jobs selected by the selecting means; and control means for printing the serial numbers assigned by the number assigning means with a printing unit onto each page in the jobs selected by the selecting means.

According to a fourth aspect of the present invention, a job processing method for an apparatus having box functions capable of selectively outputting jobs stored in a storage unit capable of storing a plurality of jobs each independent one from another, comprises: a selecting step for selecting jobs in the storage unit with the box functions; and a control step for generating output data equivalent to data created by deleting page number data from the box function job data selected in the selecting step.

According to a fifth aspect of the present invention, a job processing method for an apparatus having box functions capable of selectively outputting jobs stored in a storage unit capable of storing a plurality of jobs each independent one from another, comprises: a selecting step for selecting jobs in the storage unit with the box functions; and a control step for generating output data equivalent to data created by assigning both chapter number data and page number data to the box function job data selected in the selecting step.

According to another aspect of the present invention, a job processing apparatus, having box functions capable of selectively outputting jobs, comprises: a storage unit capable of storing a plurality of jobs to be used by the box functions, each independent one from another; selecting means for selecting jobs in the storage unit with the box functions; and control means for generating output data equivalent to data created by deleting page number data from the box function job data selected in the selecting step.

According to yet another aspect of the present invention, a job processing apparatus, having box functions capable of selectively outputting jobs, comprises: a storage unit capable of storing a plurality of jobs to be used by the box functions, each independent one from another; selecting means for selecting jobs in the storage unit with the box functions; and control means for generating output data equivalent to data created by assigning both chapter number data and page number data to the box function job data selected in the selecting step.

According to yet another aspect of the present invention, a program, for causing an apparatus, having box functions capable of selectively outputting jobs stored in a storage unit capable of storing a plurality of jobs each independent one from another, to execute a job processing method, comprises: code for a selecting step for selecting jobs in the storage unit with the box functions; and code for a control step for generating output data equivalent to data created by deleting page number data from the box function job data selected in the selecting step.

According to yet another aspect of the present invention, a program, for causing an apparatus, having box functions capable of selectively outputting jobs stored in a storage unit capable of storing a plurality of jobs each independent one from another, to execute a job processing method, comprises: code for a selecting step for selecting jobs in the storage unit with the box functions; and code for a control step for generating output data equivalent to data created by assigning both chapter number data and page number data to the box function job data selected in the selecting step.

According to yet another aspect of the present invention, a storage medium stores a program for causing the apparatus, having box functions capable of selectively outputting jobs stored in a storage unit capable of storing a plurality of jobs each independent one from another, to execute a job processing method, the program comprising: code for a selecting step for selecting jobs in the storage unit with the box functions; and code for a control step for generating output data equivalent to data created by deleting page number data from the box function job data selected in the selecting step.

According to yet another aspect of the present invention, a storage medium stores a program for causing the apparatus, having box functions capable of selectively outputting jobs stored in a storage unit capable of storing a plurality of jobs each independent one from another, to execute a job processing method, the program comprising: code for a selecting step for selecting jobs in the storage unit with the box functions; and code for a control step for generating output data equivalent to data created by assigning both chapter number data and page number data to the box function job data selected in the selecting step.

Thus, with an image processing apparatus which subjects image information read by reading means to image processing, page numbers printed on original document volumes are deleted from the image information that has been read, and images of page information of the individual original document pages in multiple original document volumes read by the reading means are assembled into a single sorted document. Accordingly, the present invention is advantageous in that serially-sorted page numbers can be assigned to the pages of the assembled document, assembled of multiple original document volumes, while avoiding a situation wherein both original page numbers and newly-assigned page numbers exist on the pages, thereby markedly improving the ease-of-reading of the page numbers in documents assembled from multiple original document volumes.

Also, with an image processing apparatus which subjects image information read by reading means to image processing, multiple pages read by the reading means are stored as jobs in storage means, and in the event of setting a joined output mode wherein jobs stored in the storage means are joined and output as one job, jobs to be joined are selected from the multiple jobs stored in the storage means, and serial numbers to be output for printing the selected jobs are assigned thereto, following which each page in the selected jobs are printed with a printing unit, with the assigned serial numbers. Accordingly, the present invention is advantageous in that in the event of joining multiple volumes of input document information or read document information into a single document which is to be output, sorted page numbers can be serially assigned according to the order of output regardless of the page information already in the pages of the jobs to be joined, thereby markedly improving the ease-of-reading of the page numbers in such assembled documents.

Further objects, features and advantages of the present invention will become apparent from the following description of the preferred embodiments with reference to the attached drawings.

BRIEF DESCRIPTION OF THE DRAWINGS

FIG. 25 is a diagram for describing a memory map of a storage medium for storing various kinds of data processing programs which can be read out by the image processing apparatus according to the present invention.

DESCRIPTION OF THE PREFERRED EMBODIMENTS

Figure 1:
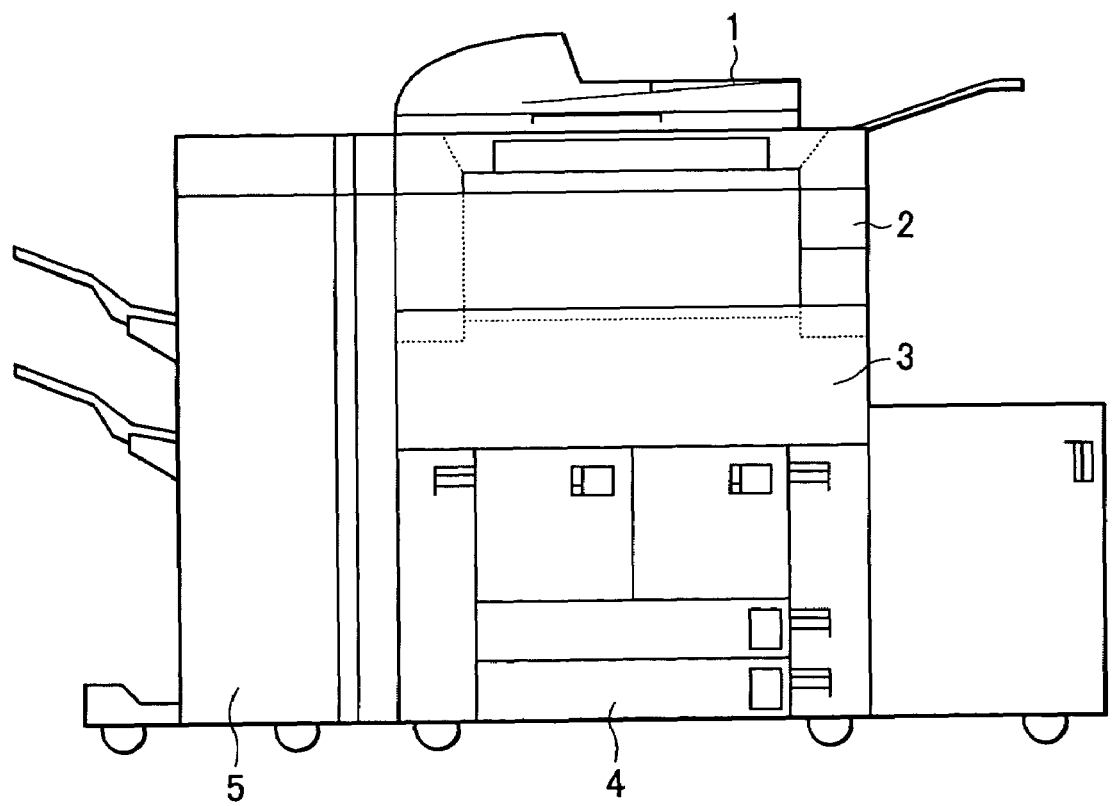
FIG. 1 is an external view which illustrates an example of an image processing apparatus to which the present invention can be applied.

In FIG. 1, reference numeral 1 denotes a document feeder for feeding one paper sheet at a time on a platen glass of a scanner unit 2 from multiple documents. Reference numeral 3 denotes a printer unit for printing out the document image data read out from the scanner unit 2, or the image data generated from the print data received from an external device through an unshown interface unit. Reference numeral 4 denotes a sheet feeding unit, having multiple sheet-feeding cassettes, for feeding a recording paper sheet of a desired size and type selected therefrom to the printer unit 3. Reference numeral 5 denotes a sorting unit, having finishing functions, for subjecting the output paper sheet printed by the printer unit 3 to predetermined post-processing (stapling, folding) or the like according to the instructions from the user, and outputting to a discharge tray or a discharge bin.

Note that, with the present embodiment, while description will be mainly made regarding an arrangement having multiple kinds of functions (at least two kinds of functions) such as copy functions, scanning functions, box functions, facsimile functions, printer functions, transmission functions, or the like, i.e., a multi-function apparatus as an example, the present embodiment is not restricted to this arrangement, and the present embodiment may be applied to a single-function apparatus having one of the aforementioned functions. Furthermore, with the present embodiment, an arrangement may be made wherein multiple units such as the scanner unit 2, the printer unit 3, and the like, are encased within a single casing, or an arrangement may be made wherein the scanner unit 2 and the printer unit 3 are encased within individual casings. As described above, the present embodiment may be applied to various kinds of function configurations and apparatus configurations (system configurations).

First Embodiment

Figure 2:
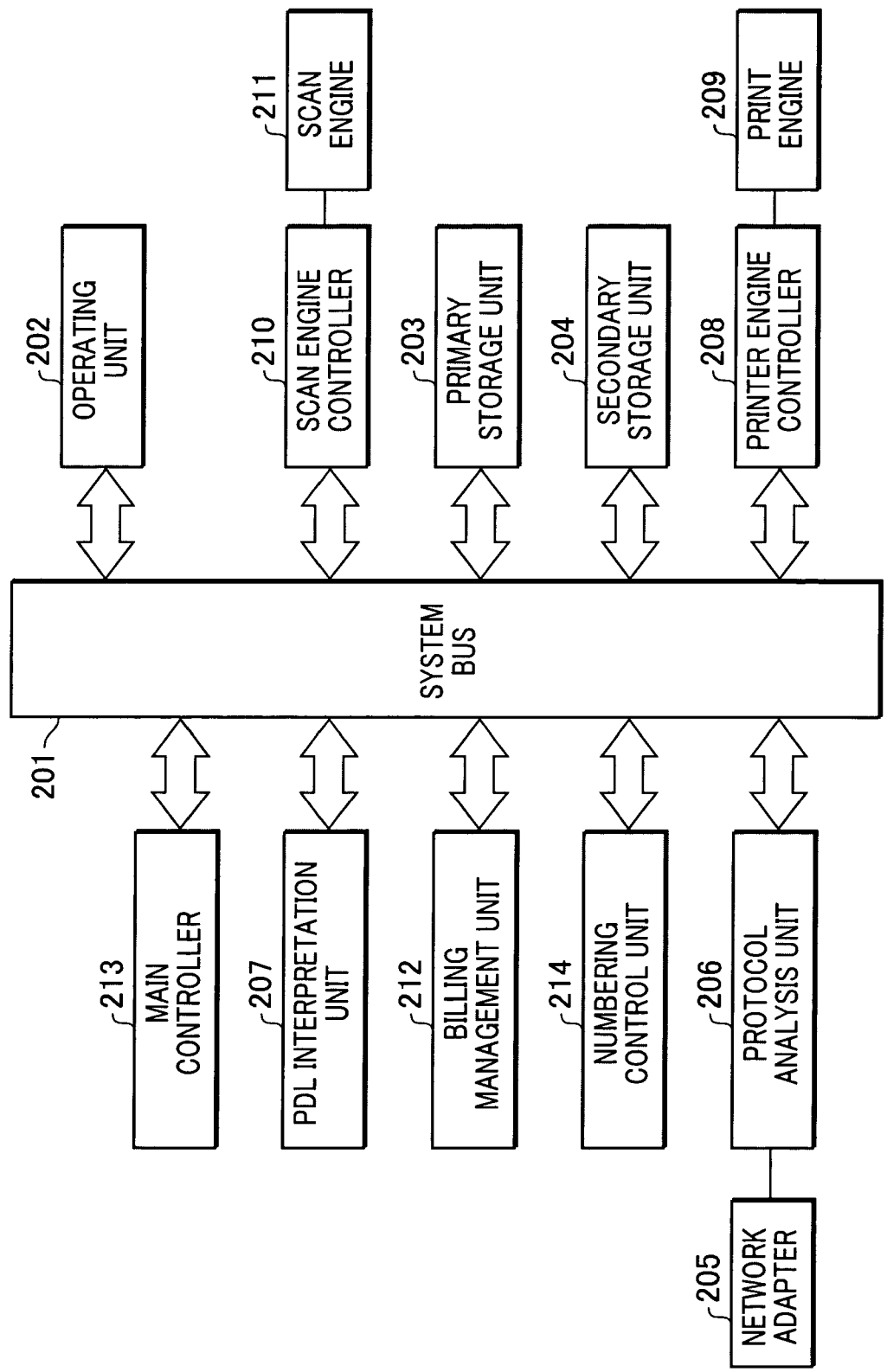
FIG. 2 is a block diagram for describing a control configuration of an image processing apparatus according to the first embodiment of the present invention.

FIG. 2 is a block diagram for describing a control configuration of an image processing apparatus according to a first embodiment of the present invention, and corresponds to the control configuration of the image processing apparatus shown in FIG. 1. Note that with the present configuration, principal modules are connected with each other via a system bus 201 for transmission/reception of data and control signals. The configuration is an example of the embodiment for description, and the present invention may be applied to any configuration as long as the configuration satisfies any of the appended claims.

In FIG. 2, an operating unit 202 is a unit formed of single or multiple keys, and a display device or a touch panel, which is a unit normally provided to such apparatuses, for enabling the input/output operations by the user.

A primary storage device 203 and a secondary storage device 204 are devices such as semiconductor storage devices, magnetic storage devices, or the like, for storing the data which is used for print processing by the system, or the data which is used for the system, for a temporary time or a long time.

A network adapter 205 is a device for performing transmission/reception of information with external devices connected through a network. A protocol analyzing unit 206 is a device for processing the data received by the network adapter 205 according to the supported protocol so as to convert to the data in an available format. Note that the operation of the network adapter 205 and the protocol analyzing unit 206 does not relate to the essence of the present invention, so detailed description thereof will be omitted.

A PDL converting unit 207 converts the Page Description Language data (PDL data) into image data, and the image data converted by the PDL converting unit 207 is transmitted to a print engine 209 via a printer engine controller 208 in order to perform physical printout processing. Detailed description thereof will be also omitted due to the same reason as above.

A scan engine 211 and a scan engine controller 210 are devices for optically scanning a document sheet so as to be converted to electronic information. Detailed description thereof will be also omitted due to the same reason as above.

An billing management unit 212 is a module for managing billing in order to charge the user rightly according to the usage of the apparatus or the amount of the expendable supplies used for printing or the like. Detailed description thereof will be also omitted due to the same reason as above.

A numbering control unit 214 is a unit for generating and synthesizing numbering information, and performing detection, deletion, or the like, of original numbering information contained in the image data.

A main controller 213 is a unit for controlling the entire MFP system, and for performing processing so as to effect the functions according to the present invention, based on the primary storage device 203 and secondary storage device 204.

Figure 3:
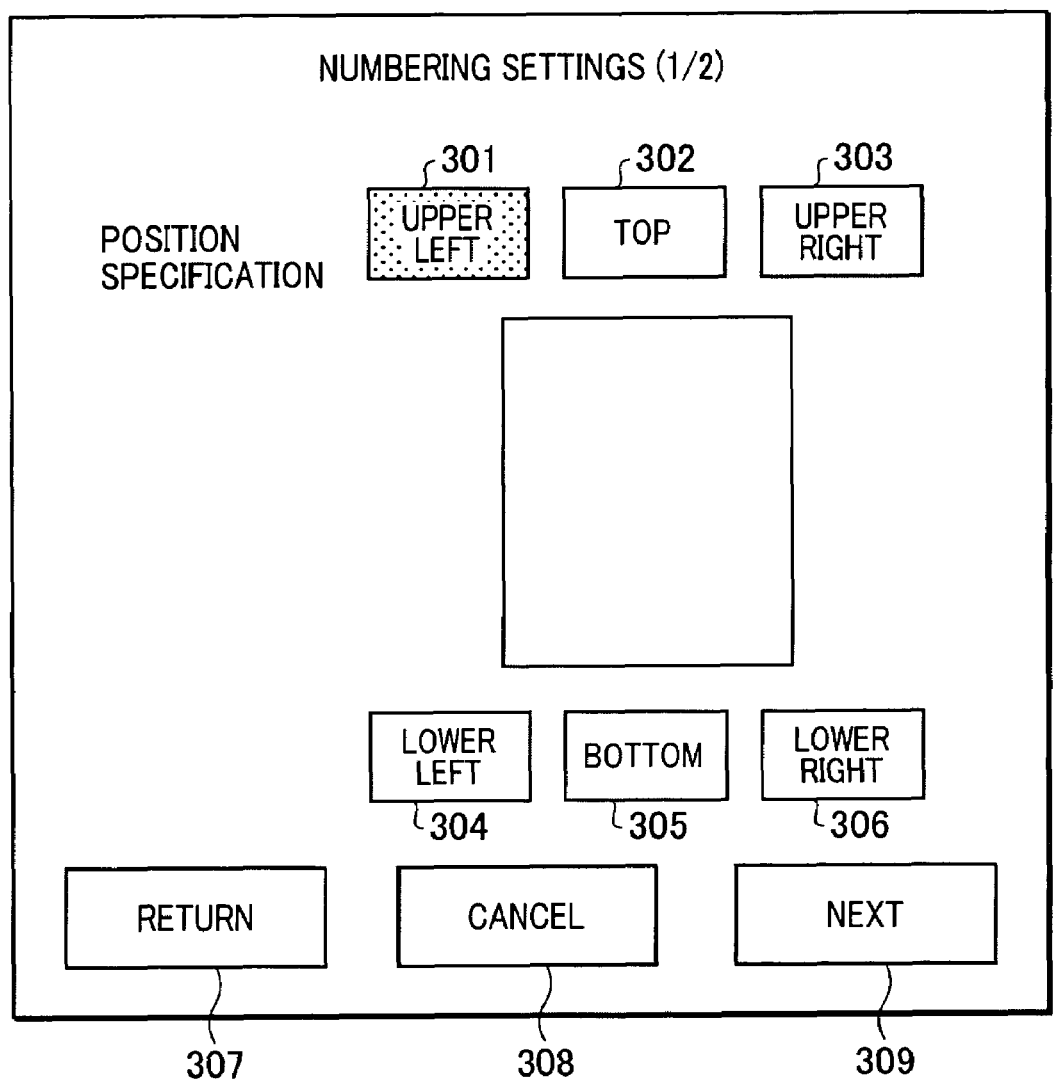
FIG. 3 is a diagram which illustrates an example of a first numbering setting screen displayed on an operating unit shown in FIG. 2.

FIG. 3 is a diagram which illustrates an example of a first numbering setting screen displayed on the operating unit 202 shown in FIG. 2, wherein multiple buttons are displayed on a touch panel, and upon the user pressing a desired button, the desired button is selected. Note that the system has a configuration wherein a screen is selected from various kinds of operating screens such as the setting screen shown in FIG. 3, a setting screen shown in FIG. 4 described later, and the like, and displayed on the display unit of the operating unit 202, under the control of the main controller 213 shown in FIG. 2.

Upon the user selecting the numbering function by operating unshown keys of the operating unit 202, the system outputs and displays the operating screen as shown in FIG. 3 on the display unit of the operating unit 202. The user can set the layout of the numbering information on the printed sheet via the operating screen shown in FIG. 3.

With the present embodiment, the user can select the portion on the sheet at which the numbering information is printed, from the six options of the "top" 302, "bottom" 305, "upper-left" 301, "upper-right" 303, "lower-left" 304, and "lower right" 306, and upon the user pressing a button, the corresponding option is selected. That is to say, upon the user selecting a printing portion with any of the keys 302 through 306 on the operating screen shown in FIG. 3, the main controller 213 performs control so as to provide page information to the original document data, which is to be subjected to numbering processing, at the portion corresponding to the portion selected by the user with the operating screen shown in FIG. 3, so as to generate the data containing the new page information, and so as to output the generated data.

Furthermore, with the present embodiment, the option of "upper-left" 301 is selected as the default setting. Upon the user selecting a desired numbering portion with one of the keys 301 through 305 on a user interface screen shown in FIG. 3, and pressing a "next" button 309, the display on the display unit of the operating unit 202 is controlled so that the operating screen shown in FIG. 3 is switched to the next setting screen. Note that, in the event that the user press a "return" button 307 or "cancel" button 308, the system performs control so that the numbering setting is canceled, and the operating screen displayed on the operating unit 202 is closed so that the display unit is returned to the state as before displaying of the operating screen.

Figure 4:
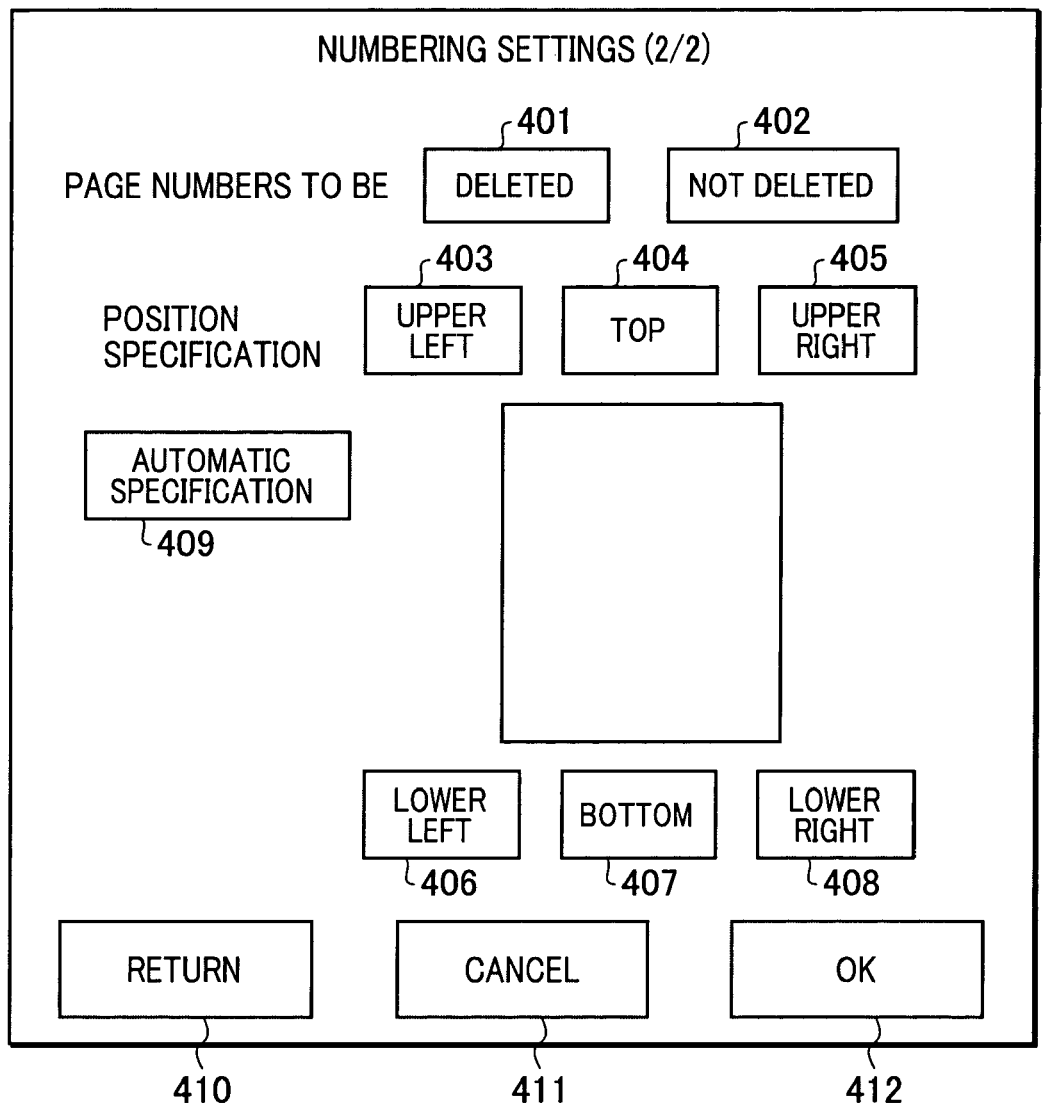
FIG. 4 is a diagram which illustrates an example of a second numbering setting screen displayed on the operating unit shown in FIG. 2.

FIG. 4 is a diagram which illustrates an example of a second numbering setting screen displayed on the operating unit 202 shown in FIG. 2, corresponding to the situation wherein the "next" button 309 on the operating screen shown in FIG. 3 is pressed by the user, and shows an example of a numbering setting screen to be displayed on the display unit of the operating unit 202.

FIG. 4 shows an operating screen having multiple touch panel keys including keys 401 and 402. The system has a configuration wherein the user can select the option whether the page numbers contained in the original image data are deleted, or leave the page numbers without change, at the time of printing the numbering information with the buttons 401 and 402 on the operating screen shown in FIG. 4.

Description will be made regarding the reason why the system has such a function. For example, let us say that in the event of providing the page numbers to the job, which is original document data and has been input to the present image processing apparatus, using the aforementioned numbering function, the original document data which is to be subjected to numbering processing contains the original page numbers (e.g., in a case that the original document data containing the page numbers is read out from the scanner of the present image processing apparatus, or in a case that the document data is formed in an external device such as a host computer or the like, settings are made so that the page numbers are provided to the document data, the document data wherein the settings of the page numbers have been made is output from the external device, and the output document data is input to the present image processing apparatus, the document data, which is to be subjected to the numbering function and is to be output, contains the page numbers provided beforehand).

In a case that such a job (original document data) is subjected to numbering processing, with the conventional configuration wherein the page information is provided in a simple manner without taking the state of the original document into consideration, both the original page numbers contained in the original document data beforehand (the page information of the original document which has been provided before the numbering processing being performed with the aforementioned numbering function), and the new page numbers which are provided with the aforementioned numbering function on the output data, are present. In this case, the conventional problems occurs in that the user might become confused at the time of obtaining the output sheet.

In order to solve the above-described problems, in the event that the image processing apparatus according to the present invention performs the processing using the numbering function, the main controller 213 performs control so as to enable the first processing (processing performed according to the instructions set by the user with the setting screen shown in FIG. 3) for providing new page information (the newest page information) to the original document data, which is to be subjected to numbering processing, using the aforementioned numbering function, and also so as to enable the second processing (processing performed according to the instructions set by the user with the setting screen shown in FIG. 4) for deleting the page information (old page information), which has been provided beforehand, contained in the aforementioned original document data, which is to be subjected to numbering processing, in order to solve the above-described problems, whereby both of or either of the processing is performed for the original document data which is to be subjected to numbering processing.

Keeping in mind that not all users might need such processing, the system has a configuration wherein the option whether or not such processing is to performed can be selected by the user. The main controller 213 has a configuration wherein the option whether or not each processing is performed can be selected by the user with the keys 401 and 402 on the operating screen, shown in FIG. 4, displayed on the display unit of the operating unit 202 of the present image processing apparatus.

For example, in the event that the user performs the first setting for providing the new page information to the original document data which is to be subjected to numbering processing, using the settings screen shown in FIG. 3 out of the multiple setting screens relating to the numbering function, and makes settings so as to enable deletion processing to be performed by pressing the key 401 in the settings screen shown in FIG. 4, the main controller 213 effects control so as to perform both the first processing for providing the new page information to the original document data, which is to be subjected to numbering processing, according to the processing conditions set in the setting screen shown in FIG. 3, and the second processing for deleting the previous page information in the original document data, which is to be subjected to the numbering processing, according to the setting screen shown in FIG. 4. On the other hand, in the event that the user performs the first setting for providing the new page information to the original document data which is to be subjected to numbering processing, using the settings screen shown in FIG. 3 out of the multiple setting screens relating to the numbering function, and makes settings so as to disable the deletion processing by pressing the key 402 in the setting screen shown in FIG. 4, the main controller 213 effects control such that, of the aforementioned first and second processing, the second processing is not performed, and only the first processing is performed (that is to say, the main controller 213 performs control so as to provide new page information to the original document data while leaving the previous page information, which has been provided to the original document data which is to be subjected to numbering processing, remaining as output data without deletion).

As described above, the system has both a mode for generating and outputting the output results corresponding to the data wherein the new page information has been provided while leaving the previous page information remaining in the input original document data, and a mode for generating and outputting the output results corresponding to the data wherein the previous page information in the input original document data has been deleted and only the new page information has been provided. Furthermore, the system has a configuration wherein the user can select either of the aforementioned modes, whereby the system can handle various kinds of needs of the user.

Furthermore, the system has a configuration wherein, in the event that the processing is performed for deleting the page information (old page information), which has been provided to the original document beforehand, from the original document data, the user can select the region (portion) where the deletion processing is to be performed using the keys 403 through 408, described later, on the screen shown in FIG. 4, i.e., the user can decide the region on the original document data where the data is to be deleted, whereby the data on the region where the user has decided, in the original document data which is to be subjected to numbering processing, is deleted. Furthermore, in the event that the user selects the key 409, described later, in the screen shown in FIG. 4, this image processing apparatus automatically detects the deletion object region (portion), i.e., automatically determines the region where the data is to be deleted, whereby the data is deleted from the region on the original document data based upon the detected results. The system has a configuration wherein such control is performed, whereby the previous page information can be suitably deleted from any portion of the original document data which is to be subjected to the numbering processing.

In the event that the user selects the "delete" key 401 in the operating screen shown in FIG. 4, the page numbers (old page information), which have been provided beforehand, contained in the original document data, are deleted, and accordingly, there is the need to provide the information regarding which portion (region) the page number has been put to the main controller 213. Accordingly, in the event that the user selects the "delete" key 401 on the operating screen shown in FIG. 4, the system performs control so that the user can set the portion where the page numbers have been put on the sheet (in the original document data) with the keys 403 through 408. Furthermore, in the event that the user selects "automatic specification" by pressing the "automatic specification" key 409, the system performs control so that the numbering control unit 214 detects the portion on the image data where the page number has been put.

While various types of methods are known for detecting the aforementioned portion, the numbering control unit 214 according to the present embodiment detects the page-number portion from the distribution of the pixel histogram obtained by scanning the image data on the upper end and the lower end, based upon the fact that in most cases, the page number is put on the upper end or the lower end on the region of the image.

The detection algorithm does not relate to the essence of the present invention, so detailed description thereof will be omitted. Note that it is needless to say that the present invention encompasses various modifications employing any detection algorithm as long as the configuration satisfies any of the appended claims.

Furthermore, in the event that the user does not select the "automatic specification" 409, the system performs control so that the user can set the portion in manual mode. With the present embodiment, the user can select the portion from the upper-left 403, top 404, upper-right 405, lower-left 406, bottom 407, and lower-right 408.

Upon the user pressing any of these buttons, the system determines the portion where the page number has been put on the sheet based upon the image region information which has been provided to the system beforehand. Note that, in the event that the user selects the "automatic specification" 409, selection of the upper-left 403, upper 404, upper-right 405, lower-left 406, bottom 407, and lower-right 408, is ignored. For example, in the event that the user presses the "automatic specification" key 409, the system performs control so as to cancel the selection of the keys 403 through 408, and so as to enable the automatic setting. On the other hand, in the event that the user presses any of the keys 403 through 408, the system performs control so as to cancel the selection of the "automatic selection" key 409, and so as to enable the user setting which has been set by the user pressing any of the keys 403 through 408.

Upon the user pressing OK button 412, the main controller 213 judges that the setting of the numbering function, selected by the user with the numbering setting screen such as the operating screen shown in FIG. 3, the operating screen shown in FIG. 4, or the like, has ended, and performs control so that the processing flow proceeds to the main processing of the numbering processing. In the event that the user presses the cancel button 411, the system effects control so as to cancel the numbering setting screen, and so as to restore the state to the state as before setting operation. In this case, the numbering processing is not performed. In the event that the user presses the "return" button 410, the system performs control so as to return the screen to the settings screen shown in FIG. 3.

It is needless to say that while the system has a configuration wherein the user can make settings with the settings screen for setting the second numbering function shown in FIG. 4, for deletion of the page information (old page information) which has been provided to the original document data beforehand, the system also has a configuration wherein the user can make settings with the settings screen for setting the first numbering function shown in FIG. 3, for performing only the processing for providing the new page information without performing the aforementioned settings for deletion (without performing deletion of the previous page information) with regard to the original document data which is to be subjected to numbering processing.

Furthermore, while, with the present embodiment, the system performs display control so that immediately following displaying the operating screen shown in FIG. 4, the "not deleted" key 402 is selected in default, the present embodiment may have a configuration wherein the "delete" key 401 is selected in default, or may have a configuration wherein the user can specify which of these keys is to be selected in default under other modes such as administrator setting, initial setting, or the like, and the key selected by the initial setting is selected on the operating screen shown in FIG. 4 in default.

In the event that the user selects the "delete" key 401, the system performs control so as to delete the page information on the region corresponding to the region information obtained based upon the instructions from the keys 402 through 409, from the original document data, and so as to provide the new page information to the aforementioned original document data according to the conditions which have been set on the setting screen shown in FIG. 3. On the other hand, in the event that the user selects the "not deleted" key 402, the system performs control so as to provide the new page information to the original document data according to the conditions which have been set on the setting screen shown in FIG. 3, while leaving the original page information (old page information) remaining in the original document data without change (the previous page information is not deleted) even in the event that the original document data contains the previous page information.

Furthermore, with the present embodiment, the system has multiple setting screens serving as setting screens for the numbering function, including the settings screen shown in FIG. 3 for performing processing for providing the new page information (the new page information) to the original document data which is to be subjected to numbering processing, and the settings screen shown in FIG. 4 for performing processing for deleting the page information (old page information) which has been provided to the original document data which is to be subjected to numbering processing beforehand, and the main controller 213 effects control so that a suitable screen is selected from the aforementioned setting screens and is displayed on the display unit of the operating unit 202. Furthermore, while the present embodiment has a configuration wherein the setting screen shown in FIG. 3 is displayed corresponding to the input from an unshown key for selecting the numbering function, following which the display flow proceeds to displaying of the setting screen shown in FIG. 4, the present invention is not restricted to this configuration, and an arrangement may be made wherein the setting screen shown in FIG. 4 is displayed, following which the operating screen shown in FIG. 3 is displayed. Furthermore, an arrangement may be made wherein the multiple independent setting screens are displayed at different times, an arrangement may be made wherein the setting screens are displayed at the same time, or an arrangement may be made wherein a single operating screen including the operation keys on the operating screen shown in FIG. 3 and the operating keys on the operating screen shown in FIG. 4 is displayed so that the user can perform setting for the above-described two kinds of processing. With any of the above-described arrangements, an user interface should be designed for ease of use of the user.

Figure 5:
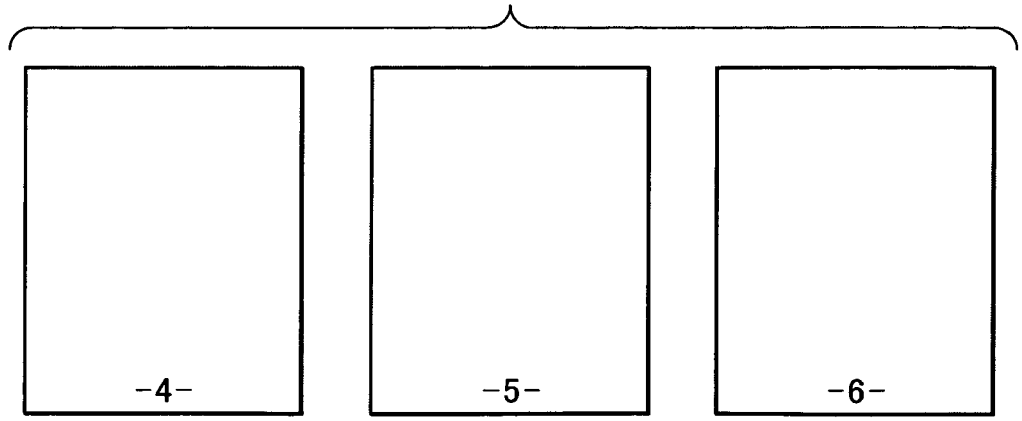
FIG. 5 is a schematic diagram for describing the state of a first numbering process for the image processing apparatus according to the present invention.

FIG. 5 is a schematic diagram for describing a first state of the numbering processing of the image processing apparatus according to the present invention, wherein three consecutive pages of image data (i.e., the original input data which is to be subjected to the numbering processing) containing multiple pages are shown. With the aforementioned example, the page numbers have been placed around the center of the lower end of each image data. The image data corresponds to the original document data wherein the page information (old page information) has been provided prior to the numbering function being performed by the present image processing apparatus.

Figure 6:
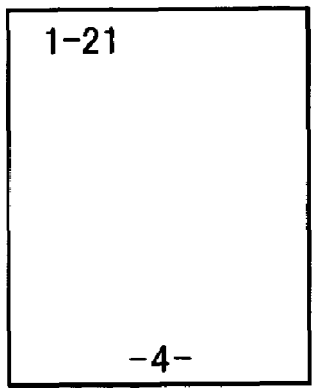
FIG. 6 is a schematic diagram for describing the state of a second numbering process for the image processing apparatus according to the present invention.
Figure 6:
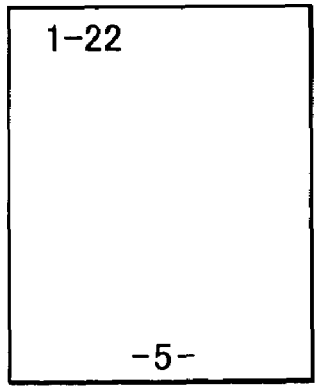
Figure 6:
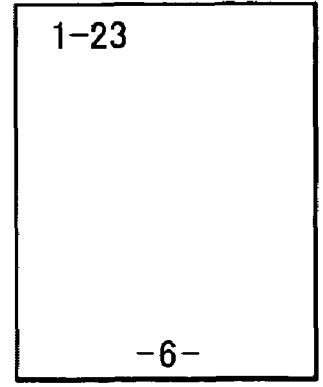

FIG. 6 is a schematic diagram for describing a second state of the numbering processing for the image processing apparatus according to the present invention, wherein an example of the output data (first output example) is shown, generated by the present image processing apparatus performing the numbering processing for the original document data (original document data wherein the page information has been already provided), shown in FIG. 5 described above, which is to be subjected to the numbering processing, according to the setting of the numbering function which has been set on the setting screen shown in FIG. 3 or FIG. 4. For example, in the event that the user selects the numbering function, selects the "upper-left" key 301 from the six numbering-portion options of the keys 301 through 306 on the numbering setting screen shown in FIG. 3, and selects the "not deleted" key 402 on the operating screen shown in FIG. 4, for the original input data, shown in FIG. 5, wherein the page information has been already provided, the main controller 213 performs control according to the above-described instructions so that the new page information is provided on the upper-left portion of the original document data while leaving the previous page information contained in the original document data shown in FIG. 5 remaining therein without change. Thus, the output data as shown in FIG. 6 is generated.

As shown in FIG. 6, with the present example, the numbering information is printed on the upper-left portion of the page, and the page numbers contained in the original image data are left remaining on the center of the bottom, as well.

Figure 7:
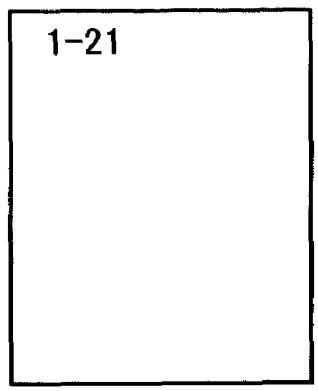
FIG. 7 is a schematic diagram for describing the state of a third numbering process for the image processing apparatus according to the present invention.
Figure 7:
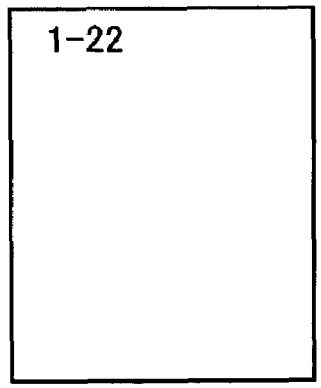
Figure 7:
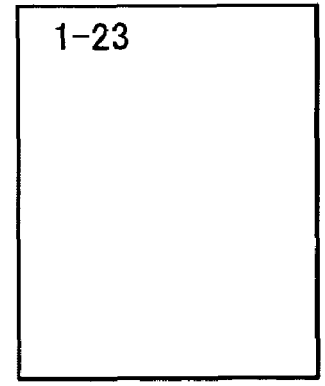

FIG. 7 is a schematic diagram for describing a third state of the numbering processing for the image processing device according to the present invention, wherein another example of the output data (second output example) is shown, generated by the present image processing apparatus performing the numbering processing for the original document data (original document data wherein the page information has been already provided), shown in FIG. 5 described above, which is to be subjected to the numbering processing, according to the setting of the numbering function which has been set on the setting screen shown in FIG. 3 or FIG. 4, whereby the output result different from the example shown in FIG. 6 is obtained. For example, in the event that the user selects the numbering function, selects the "upper-left" key 301 from the six numbering-portion options of the keys 301 through 306 on the numbering setting screen shown in FIG. 3, and selects the "delete" key 401 on the operating screen shown in FIG. 4, for the original input data, shown in FIG. 5, wherein the page information has been already provided, the main controller 213 performs control so as to delete the previous page information of the original document data shown in FIG. 5, and so as to provide the new page information at the upper-left portion of the original document data, according to the above-described instructions. Note that, as described above, in the event that the user selects the "delete" key 401 on the screen shown in FIG. 4, there is the need to specifying the deletion region in the original image data. In this case, as shown in FIG. 5, the page numbers are contained on the center of the lower end in the original image data. Accordingly, the user selects the method wherein the user selects the "lower portion" key 407 on the operating screen shown in FIG. 4 in manual mode, or the method wherein the user selects the "automatic specification" key 409 so that the apparatus performs automatic detection of the deletion region in the original image data (the apparatus automatically detects the page information in the original image data), whereby the system obtains the information with regard to the deletion region, following which the main controller 213 performs control so that the page numbers contained on the center of the lower end of the original image data shown in FIG. 5 are deleted. Thus, the output data as shown in FIG. 7 is generated.

As shown in FIG. 7, with the present example, the page numbers at the center of the bottom of the original image data is deleted, and the numbering information is printed on the upper-left portion.

Figure 8:
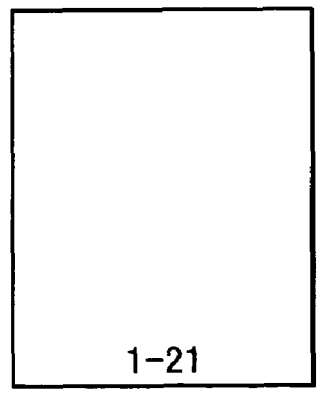
FIG. 8 is a schematic diagram for describing the state of a fourth numbering process for the image processing apparatus according to the present invention.
Figure 8:
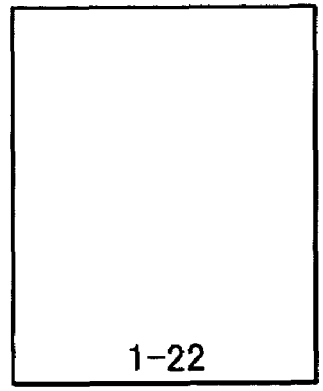
Figure 8:
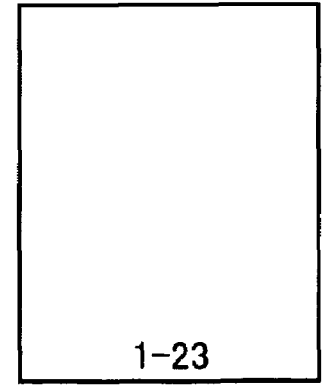

FIG. 8 is a schematic diagram for describing a fourth state of the numbering processing for the image processing apparatus according to the present invention, wherein further another example of the output data (third output example) is shown, generated by the present image processing apparatus performing the numbering processing for the original document data (original document data wherein the page information has been already provided), shown in FIG. 5 described above, which is to be subjected to the numbering processing, according to the setting of the numbering function which has been set on the setting screen shown in FIG. 3 or FIG. 4, whereby the output result different from the examples shown in FIGS. 6 and 7 is obtained. For example, in the event that the user selects the numbering function, selects the "lower-portion" key 305 from the six numbering-portion options of the keys 301 through 306 on the numbering setting screen shown in FIG. 3, selects the "delete" key 401 on the operating screen shown in FIG. 4, and selects the "lower portion" key 407 or the "automatic specification" key 409 on the operating screen shown in FIG. 4 so that the system determines the deletion region to be the portion on the center of the lower end of the original image data, for the original input data, shown in FIG. 5, wherein the page information has been already provided, the main controller 213 effects control so as to delete the page information contained on the center portion of the lower end of the original image data shown in FIG. 5 according to the setting performed on the screen shown in FIG. 4, and so as to provide the new page information on the center portion of the lower end of the original image data according to the setting performed on the screen shown in FIG. 3. Thus, the output data such as shown in FIG. 8 is generated.

As shown in FIG. 8, with the present example, the original page numbers contained in a portion of the original document data is deleted, and the new numbering information is printed on the same portion.

Figure 9:
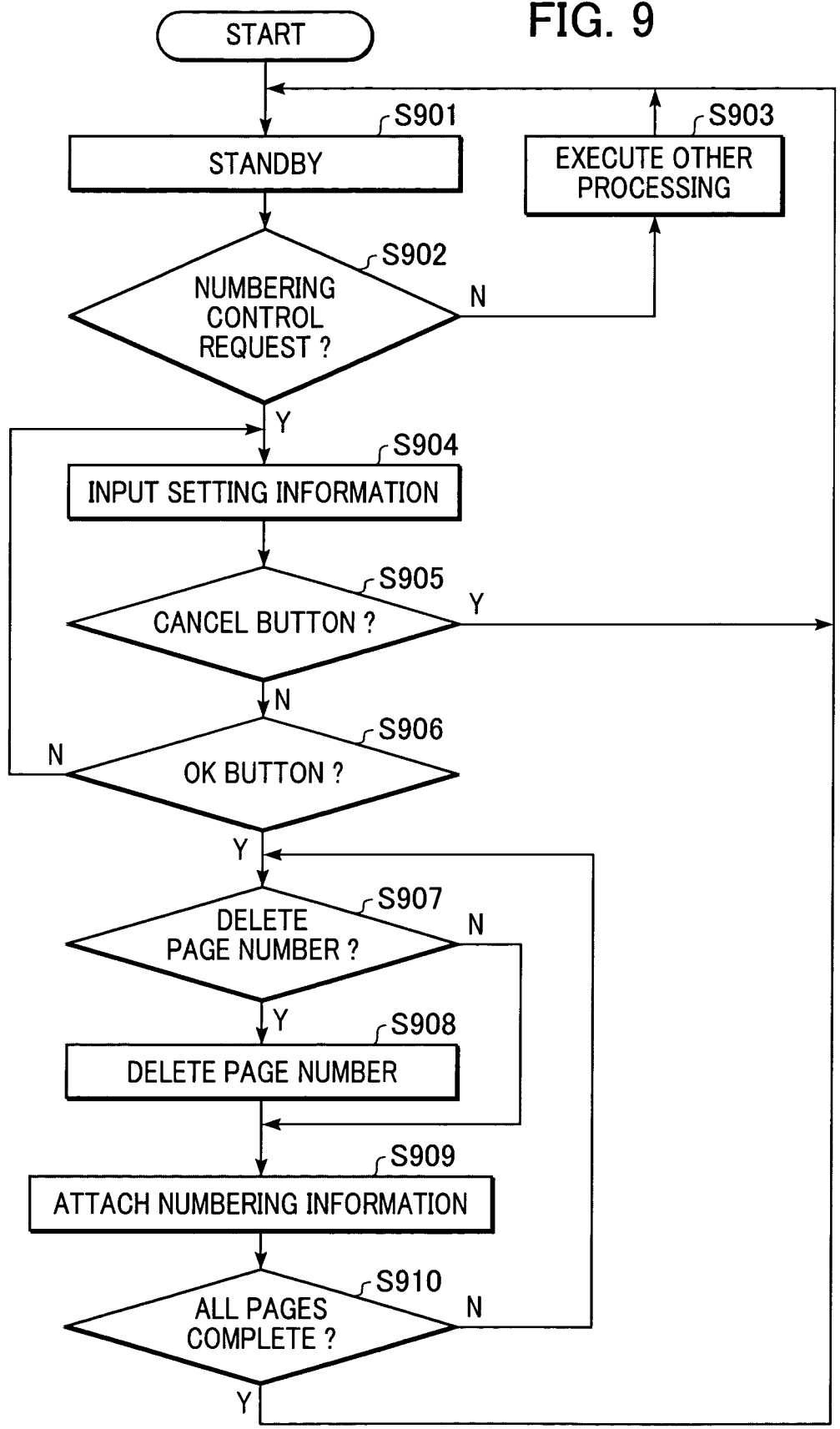
FIG. 9 is a flowchart which shows an example of a first data processing procedure for the image processing apparatus according to the present invention.

FIG. 9 is a flowchart which shows an example of a first data processing procedure of the image processing apparatus according to the present invention, and corresponds to the numbering control procedure of the control performed by the main controller 213. Note that reference numerals S901 through S910 denote steps.

First of all, the system waits for requests for processing input from the operating unit 202 by the user (Step S901). Upon the user making a request with the operating unit 202, the flow proceeds to Step S902, judgment is made whether or not the numbering control is required (judgment is made based upon the fact whether or not the user presses an unshown operating key on the operating unit 202 for selecting the aforementioned numbering function, for example), and in the event that processing other than the numbering control is required, other processing is performed (S903), following which the flow returns to the state for waiting for requests for processing shown in Step S901.

On the other hand, in Step S902, in the event that judgment is made that the numbering control is required by the user through the operating unit 202, the flow proceeds to Step S904, and a suitable setting screen is selected from the setting screens shown in FIGS. 3 and 4 so as to be displayed on the operating unit 202 in order to prompt the user to perform setting for the numbering processing.

Subsequently, judgment is made whether or not the cancel button 411 on the screen shown in FIG. 3 or the cancel button 308 on the screen shown in FIG. 4 is pressed during the setting by the user (Step S905), and in the event that judgment is made that any one of the cancel buttons is pressed, the numbering processing is canceled without performing any processing, and the flow returns to the state for waiting for requests for processing shown in Step S901.

On the other hand, in the event that judgment is made that no cancel button is pressed in Step S905, the flow proceeds to Step S906, judgment is made whether or not the OK button 412 is pressed on the operating screen shown in FIG. 4, and in the event that judgment is made that the OK button 412 is not pressed, this means that settings are still being made, and accordingly, the flow returns to Step S904.

On the other hand, in Step S906, in the event that judgment is made that the OK button 412 is pressed, this means that the setting processing by the user has ended, and accordingly, the various kinds of processing conditions with regard to setting for the numbering function, which have been set on the screens shown in FIGS. 3 and 4, are stored in unshown memory, following which the flow proceeds to Step S907.

Subsequently, the system begins the actual numbering processing from Step S907, wherein judgment is made whether or not the option that the page numbers contained in the original image data are delete at the time of numbering is selected, based upon the selection results from the keys 401 and 402 shown in FIG. 4. In the event that judgment is made that the option of deletion of the page numbers has been set by the "delete" key 401 on the screen shown in FIG. 4 being selected, the flow proceeds to Step S908. In Step S908, the system performs control so that the numbering control unit 214 performs image deletion processing for the image data (old page information) on the portion of the page number corresponding to the deletion portion specified based upon the selection results from the keys 403 through 409 on the screen shown in FIG. 4, contained in the image data stored in the primary storage device 203 or the secondary storage device 204, using the above-described method, following which the flow proceeds to Step S909.

Note that, in Step S907, in the event that judgment is made that the option for deletion of the page numbers has not been selected by the user selecting the "not deleted" key 402 on the screen shown in FIG. 4, the flow skips the deletion processing in Step S908, and proceeds to Step S909.

Subsequently, in Step S909, the system performs control so that the numbering control unit 214 performs processing for adding the numbering information (processing for putting the page information) to the image data stored in the primary storage device 203 or the secondary storage device 204 based upon the settings decided upon by the user with the numbering setting screen shown in FIG. 3.

Subsequently, the flow proceeds to Step S910, and judgment is made whether or not the above-described processing has ended for all the pages in the image data, and in the event that judgement is made that unprocessed pages still remain, the flow returns to Step S907, and processing is performed for the remaining pages. For example, with the example shown in FIG. 5, the system has three pages of original document data which is to be subjected to processing, and accordingly, the system performs control so that the processing from the Step S907 to Step S909 is repeated the number of times corresponding to three pages of the original document data. For example, in the event that the system generates the output data shown in FIG. 7 from the original data shown in FIG. 5, the processing in Step S908 is repeated the number of times corresponding to the three pages, whereby the page numbers of the original data "-4-", "-5-", and "-6-", are deleted in serial order. Furthermore, in the event that the processing in Step S909 is repeated, as shown in the output results in FIGS. 6 through 8, the page number which is to be provided is incremented by one for each new page, each time the processing in Step S909 is performed, whereby new page numbers such as "1-21", "1-22", and "1-23" are provided, for example.

On the other hand, in Step S910, in the event that judgment is made that processing has ended for all the pages, the numbering processing ends, and the flow returns to the processing for waiting for requests shown in Step S901.

With apparatuses having multi-functions such as the present image processing apparatus, the system has a configuration wherein the numbering processing using the numbering function performed under the control of the main controller 213 can be performed for the document data from the device having the copy function, and also can be performed for the document data from an external device having the facsimile function, printer function, or the like. Note that the system has a configuration wherein, in the event of performing the same processing as the above-described processing with the printer function, for example, a printing setting screen having the same functions as with the operating screen shown in FIG. 3 or the operating screen shown in FIG. 4 is displayed on the display unit of the host computer via a printer driver of the host computer so that the host computer can receive the same instructions as with the setting screen shown in FIG. 3 or FIG. 4 from the user via the user interface at the host computer side, and the system receives the instructions corresponding to the original document data from the host computer, following which the main controller 213 analyzes the aforementioned instructions, and effects control so that the numbering processing is performed based upon the aforementioned instructions, whereby the system can generate various kinds of output data as shown in FIGS. 6 through 8. Furthermore, while description has been made regarding the system having a configuration wherein the numbering processing for generating the output data shown in FIGS. 6 through 8 is performed on the side of the present image processing apparatus, the system may have a configuration wherein the aforementioned processing is performed by the control unit on the side of the host computer via the printer driver or the like of the host computer. Note that, in this case, the processing (processing shown in the flowchart in FIG. 9, or the like) which is to be performed under the control of the main controller 213 on the side of the present image processing apparatus in the above-described arrangement, is performed on the host computer side, the system has a configuration wherein the present image processing apparatus receives the data which has been already subjected to the numbering processing as shown in FIGS. 6 through 8 so as to print out without change. As described above, the present embodiment may be applied to any arrangement.

Furthermore, the numbering processing according to the present embodiment can be performed for the original document data which has been subjected to processing with the box functions included in the image processing apparatus according to the present embodiment. As described above, with the image processing apparatus having the box functions, the numbering processing according to the present embodiment is effective in the job with the box functions.

Description will be made regarding the box functions (which will be also referred to as "box mode") included in the image processing apparatus according to the present embodiment. The box functions are functions wherein the main controller 213 performs storage control so that the image data input from the scanner unit included in the present image processing apparatus, or the image data received by a reception unit such as the network adapter 205 or the like included in the present image processing apparatus, is stored in an unshown box region within a storage unit, which can store multiple pages of image data, such as a hard disk or the like included in the present image processing apparatus, and the user can obtain desired image data from the box region at a desired time, the desired number of times, by a desired amount, and in a desired output format, so as to print out the image data with the printer unit included in the image processing apparatus, or so as to transmit the image data to other apparatuses, by the user operating the operating unit 202 included in the image processing apparatus.

Note that the box functions according to the present embodiment can be roughly classified into two kinds of processing: one is processing for storing the input original document data in the box region within memory such as a hard disk or the like (storage processing); and the other is output processing for outputting the original document data stored in the box region. The present embodiment has a configuration wherein the aforementioned storage processing for storing the original document data in the box region, and the output processing for outputting the original document data stored in the box region, are performed using the memory which can store multiple pages, such as a hard disk, and accordingly the above-described two kinds of processing can be performed at the same time or at separate time points according to the instructions from the user.

Furthermore, the storage processing of the box functions comprises storage processing for storing the original document data from the scanner unit in the box region, and storage processing for storing the original document data from an external device in the box region, wherein, with the former, the user selects the box functions with the operating unit 202, and sets various kinds of necessary parameters (parameters with regard to output conditions such as the size of the original document, magnification, and the like) at the time of storage, and with the latter, the user selects the box functions with an external device such as a host computer which transmits the image data which is to be stored in the box region, and sets various kinds of necessary parameters at the time of storage. On the other hand, with regard to the output processing of the box functions, the system has a configuration wherein the user can output both the image data read out from the scanner and the image data which has been received from an external device such as a host computer or the like and has been stored in the box region, from the box region with the operating unit 202 included in the present image processing apparatus. Furthermore, the system has a configuration wherein the output conditions (the sheet size, the number of printed sheets, instructions for sorting, stapling, or the like, and the like) desired by the user can be input with the operating unit 202 at the time of processing for outputting the original document data from the box region, the original document data stored in the box region is assembled so as to be output according to the output condition, and the output device can be selected from various kinds of output devices such as a printer, an external device, and the like.

Furthermore, the system has a configuration wherein the storage unit included in the image processing apparatus according to the present embodiment, such as a hard disk or the like, includes multiple box regions (e.g., 100 box regions), and the user can selects a desired box region. Furthermore, the system has a configuration wherein each box region can store a series of multiple image data sets (multiple jobs). Accordingly, in order to output a job from a box region, the system has a configuration wherein the user selects a desired box from the multiple boxes with the operating unit 202, selects a desired job, which is to be output, from multiple jobs stored in the selected box, performs setting of output conditions for the selected job, and the job selected by the user is output according to the output conditions specified by the user with the operating unit 202.

Furthermore, with the box functions included in the image processing apparatus according to the present embodiment, the system may have a configuration wherein the user can select only one job (a series of one image data set), or selects multiple jobs (a series of multiple image data sets), from multiple jobs independent of each other and stored in the selected box at the time of user selecting desired jobs from the selected box. As described above, the system has a configuration wherein the user can specify the number of jobs to be selected from the jobs stored in the box. Furthermore, the system has a configuration wherein, in the event that the user selects multiple jobs, the jobs are converted into a single job in a serial form so as to be consecutively printed out with a printer unit, or so as to be consecutively transmitted to other external devices.

Furthermore, with regard to a case that the user selects multiple jobs independent of each other from the box, and the selected multiple jobs are consecutively read out from the box so as to be output, the system has two modes: one is a joining mode wherein the multiple jobs independent of each other are joined into a single job included in a single group so as to be output; and the other is a non-joining mode wherein the multiple jobs are not joined, but rather are output as separate jobs in separate groups. The system has a configuration wherein the user can select one mode from the above-described two modes by operating the operating unit 202.

As described above, the image processing apparatus according to the present embodiment has the box functions for performing various kinds of processing, and the numbering processing according to the present embodiment can be performed for the job with such box functions, and furthermore, the numbering processing improves the advantage of the box functions.

The reason is that, for example, with the above-described box functions, in the event that the user selects multiple jobs, these documents might be required to be output as a single job in a single group in a single format using the document joining mode. On the other hand, these multiple jobs are independent and individual jobs, and accordingly, each job might have individual page number information. Taking such a situation into consideration, it can be understood that in the event that multiple jobs are joined into a single document according to selection of multiple jobs from the box, and selection of the document-joining mode, made by the user, problems such as the problem of multiple pages having the same page number being in the output results, and the problem of page numbers existing in different positions and in different formats, tend to easily occur. Occurrence of such problems causes poor appearance of the output results, and furthermore causes the user to become confused. In order to solve the above-described problems, with the present embodiment, the system performs control so that the above-described numbering processing is performed for the jobs with the box functions in the same way, thereby preventing the above-described problems.

For example, in the event that multiple jobs are consecutively output from a desired box according to the selection of the box functions and selection of the multiple jobs from the desired box made by the user, the main controller 213 effects control so that the numbering setting screen shown in FIG. 3 or the numbering setting screen shown in FIG. 4 is displayed on the display unit 202, and desired processing with regard to the numbering functions can be performed for multiple jobs selected from the aforementioned box by the user according to the instructions specified by the user. More specifically, for example, in the event that multiple box function jobs are joined into a single job to be output, all the page information (old page information) contained in the original image data of these multiple jobs which are to be joined is deleted from the multiple jobs which are to be joined, according to the settings performed in the operating screen shown in FIG. 4. Subsequently, the main controller 213 effects control so that the multiple jobs are joined into joined data as a single data set in a single group with the page information of the original image data having been deleted, and with new page information being provided so as to be generated and output.

Furthermore, with the present embodiment, in a case that the box functions are selected, and accordingly, multiple jobs selected from a box by the user are consecutively output, the system may performs control so that, in the event of performing output with either mode of the joining mode and the non-joining mode, the above-described numbering processing can be carried out, or the system may perform control so that in the event of performing output with one particular mode only (e.g., only with the joining mode), the numbering processing can be carried out.

Furthermore, in a case that multiple jobs selected from a box by the user are consecutively output with the joining mode or non-joining mode, the system has a configuration wherein multiple kinds of numbering settings such as the first setting for the numbering processing through the setting screen shown in FIG. 3, the second setting for the numbering processing through the setting screen shown in FIG. 4, and the like, can be independently performed. Furthermore, the system may have a configuration wherein the main controller 213 performs control so that both the first processing (processing for providing new page number information) and the second processing (processing for deleting the previous page number information contained in the original image data) of the multiple kinds of numbering processing, can be performed, only desired processing can be performed (e.g., only the first processing is performed, only the second processing is performed, or the like), as well, and also the user can select the numbering processing which is to be used, according to the instructions decided upon by the user operating the operating unit 202.

Thus, with the present embodiment, the system can perform control so that for example, the new page number information is not provided (in the event that setting is not performed on the screen shown in FIG. 3), and the page number information provided to the original image data contained in the multiple jobs which are to be joined with the box functions is deleted (in the event that setting is performed only on the screen shown in FIG. 4), whereby the joined data can be generated and output with the page number information contained in the original image data having been deleted. Note that the system may have not only a configuration wherein such generated data is printed out with a printer, or is transmitted to other devices, according to the instructions from the user, but also the system may include processing for storing the generated data in the box as an option of output processing, and may have a configuration wherein the user can select the above-described option. In a case that the generated joined data is stored in a box, the system may have a configuration wherein the replacing processing for storing the generated joined data while deleting the original jobs which have been subjected to the joining processing, or the like, and the processing for storing the generated joined data while leaving the original jobs which have been subjected to the joining processing remaining in the box without change, can be selectively performed.

Such a configuration further improves the advantages of the present embodiment. Furthermore, with the digital photocopier having this box function, owing to the joining of the joining print function for joining multiple documents so as to be printed out and the function for printing documents by chapters, the chapter number is automatically incremented for each new document at the time of printing, thereby providing a digital photocopier wherein the position of chapters can be easily changed with the function for printing documents by chapters. Further detailed description will be made in a second embodiment described below regarding the numbering processing for the jobs with the box functions.

Second Embodiment

While description has been made in the above-described first embodiment regarding an arrangement wherein the original page numbers printed on the original documents are deleted, and new page numbers in serial order are automatically provided to an assembled document at the time of assembling multiple original document sets into a single document, the second embodiment may have a configuration wherein the system performs control so that the user selects multiple original-document image data files (jobs) in a desired order, and the page numbers newly assigned in serial order are automatically provided at the time of printing out the joined data, or so that the page numbers are automatically provided for each chapter with each original document set as a chapter. Description will be made now regarding this embodiment.

Figure 10:
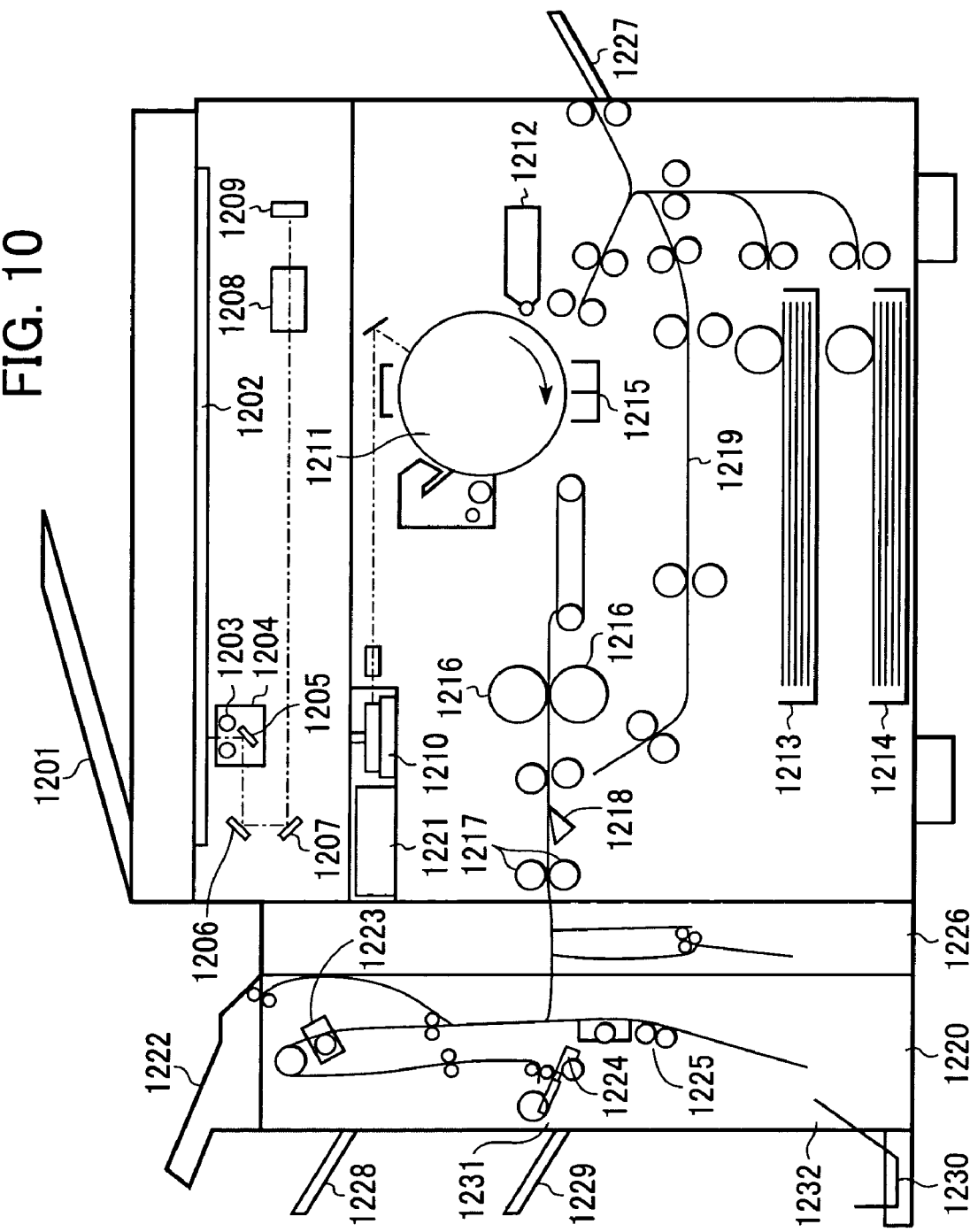
FIG. 10 is a cross-sectional diagram which illustrates an example of an image processing apparatus according to a second embodiment of the present invention.

FIG. 10 is a cross-sectional diagram which illustrates an example of an image processing apparatus according to the second embodiment of the present invention, and in particular, corresponds to a configuration example of the image processing apparatus shown in FIG. 1.

In FIG. 10, an original document feeding device 1201 feeds an original document onto a platen glass 1202 one by one in serial order from the top thereof, and following the original document being read out, the original document on the platen glass 1202 is discharged. Upon the original document being transported onto the platen glass 1202, a lamp 1203 is turned on, and movement of a scanner unit 1204 is started so that exposure scanning is performed for the original document. In this case, the reflected light from the original document is introduced to a CCD image sensor (which will be referred to as "CCD" hereafter) 1209 through mirrors 1205, 1206, and 1207, and a lens 1208. As described above, the image obtained by scanning the original document is read out by the CCD 1209. A laser driver 1221 is a unit for driving a laser emission unit 1210, and more particularly, a unit for performing control so that the laser emission unit 1210 emits a laser beam with a strength corresponding to the output image data. The laser beam is cast to a photosensitive drum 1211, whereby a latent image is formed on the photosensitive drum 1211 according to the strength of the laser beam. Furthermore, a developing unit 1212 causes adhesion of a developing agent to the portions, where the latent image has occurred, on the photosensitive drum 1211.

Note that in the event that the image processing apparatus according to the present embodiment is a color image processing apparatus, the image processing apparatus includes four developing units for the four colors of yellow, magenta, cyan, and black. A recording sheet is supplied from any of cassettes 1213 and 1214 and a hand-feed tray 1227, synchronously with starting of emission of the laser beam, so as to be transmitted to a transfer unit 1215, whereby the developing agent adhering to the photosensitive drum 1211 is transferred onto the recording sheet.

Subsequently, the recording sheet to which the developing agent has adhered is transported to a fixing unit 1216, and the developing agent is fixed onto the recording sheet by heat and pressure of the fixing unit 1216. The recording sheet output from the fixing unit 1216 is discharged by a discharge roller 1217. In the event that setting of double-sided recording has been performed, following the recording sheet being transported to the discharge roller 1217, the discharge roller 1217 is rotated in the reverse direction, and the recording sheet is introduced to a sheet re-supplying transport path 1219 by a flapper 1218. The recording sheet introduced to the re-supplying transport path 1219 is re-supplied to the transfer unit 1215 at the above-described timing.

On the other hand, in a case that the main unit of the image processing apparatus includes a saddle stitcher 1225, the recording sheet is transported to a z-folding unit. In the event that a finisher 1220 is provided for folding a recording sheet in the shape of the letter Z according to the operation from the operating unit, the finisher 1220 sorts out the set of the discharged recording sheets, punches recording sheets with a puncher 1223, and staples sheets with a stapler 1224 according to the instructions from the user.

Furthermore, in the event of using a saddle stitcher 1225, the recording sheets are stitched at the center portion, and subsequently, the recording sheets are folded along the center portion, whereby the recording sheets are bound into a book. An inserter 1222 enables recording sheets printed beforehand to be supplied as book covers or inserting sheets, and the printed sheets can be supplied without passing through the recording-sheet path of the printer unit, and thus, the recording sheets can be transported without damage. In a case of a job not using the saddle stitcher 1225, the recording sheet passes through a discharge opening 1231, and is discharged to one of movable trays (discharge bins) 1228 and 1229.

Both the movable trays 1228 and 1229 can be moved in the vertical direction. For example, in the event of outputting a recording sheet to the movable tray 1228, the movable tray 1228 is moved downward to the position of the discharge opening 1231. In a case of a job using the saddle stitcher 1225, the job passes through the discharge opening 1232, and is discharged to a book tray 1230.

Figure 11:
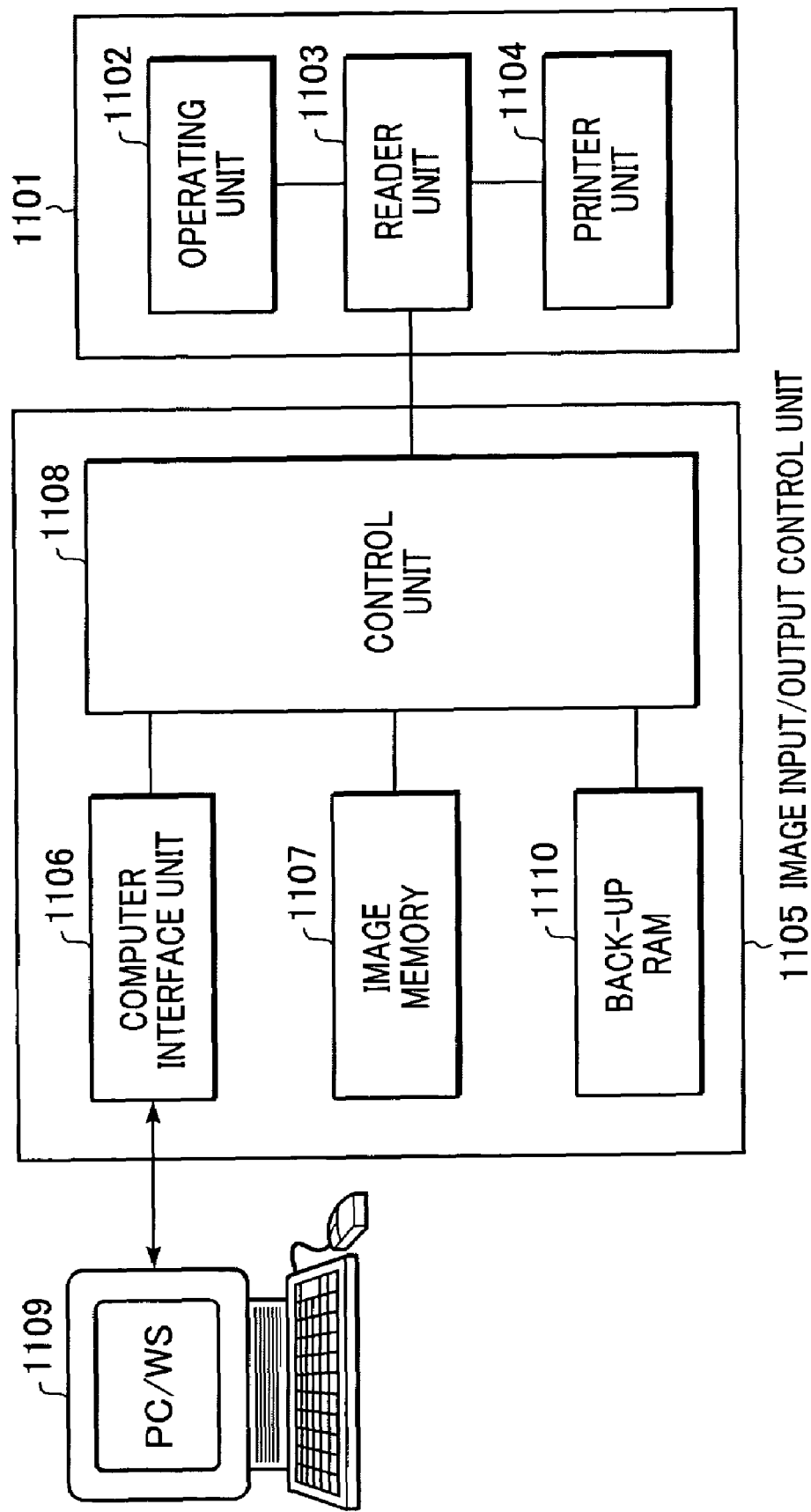
FIG. 11 is a block diagram for describing a system configuration of the image processing apparatus shown in FIG. 10.

FIG. 11 is a block diagram for describing a system configuration of the image processing apparatus shown in FIG. 10. In FIG. 11, reference numeral 1101 denotes a digital photocopier main unit (image processing apparatus) which includes an operating unit 1102 (which may be the same unit as the operating unit 202 described in the first embodiment), a reader unit 1103 (which may be the same unit as the reader unit 2 described in the first embodiment), a printer unit 1104 (which may be the same unit as the printer unit 3 described in the first embodiment), and so forth. The operating unit 1102 is used for operating the digital photocopier main unit 1101 and an image input/output control unit 1105. The reader unit 1103 reads out the image of the original document, and outputs the image data corresponding to the original image to the printer unit 1104 and the image input/output control unit 1105. The printer unit 1104 records an image corresponding to the image data from the reader unit 1103 and the image input/output control unit 1105 on a recording sheet.

The image input/output control unit 1105 is connected to the reader unit 1103, and includes a computer interface unit 1106, an image memory unit 1107 (which may be the same unit as the primary storage device 203 or the secondary storage device 204 described in the first embodiment), a control unit 1108 (which may be the same unit as the main controller 213 described in the first embodiment), backup RAM 1110, and the like.

Note that the image memory unit 1107 includes a storage unit, which can store multiple pages of data, such as a hard disk or the like, and the system has a configuration wherein the aforementioned hard disk can store the original document image data input from the reader unit 1103, and the original document image data output from an external device such as a computer 1109 or the like, which is input through the computer interface 1106. Furthermore, the system can perform processing with box functions using the hard disk in the image memory unit 1107. While with the present embodiment, description will be mainly made regarding an arrangement wherein the present image processing apparatus includes the aforementioned image memory unit 1107, the present invention is not restricted to the such an arrangement, and the present invention may be applied to an arrangement wherein an external device (server, computer, or the like) includes the aforementioned image memory unit 1107. In any case, the system should be able to perform processing with the functions according to the present embodiment, such as the box functions or the like, using a storage unit, which can store multiple jobs formed of multiple pages independent of each other, such as a hard disk or the like.

The computer interface unit 1106 (which may be the same unit as the network adapter 205, the protocol analyzing unit 206, or the PDL converting unit 207, described in the first embodiment) is an interface between a print server 1109 made up of a personal computer or work station (PC/WS) and the control unit 1108, and converts the code data (PDL), which represents an image, transmitted from the print server 1109, into image data wherein recording can be performed in the printer unit 1104, and the converted data is transmitted to the control unit 1108.

While detailed description will be made later regarding the control unit 1108, in brief, the control unit 1108 controls the data flow between the reader unit 1103, the computer interface unit 1106, and the image memory unit 1107.

The backup RAM 1110 is non-volatile memory, and stores the data which is needed to be stored for the digital photocopier main unit 1101 and the image input/output control unit 1105.

Figure 12:
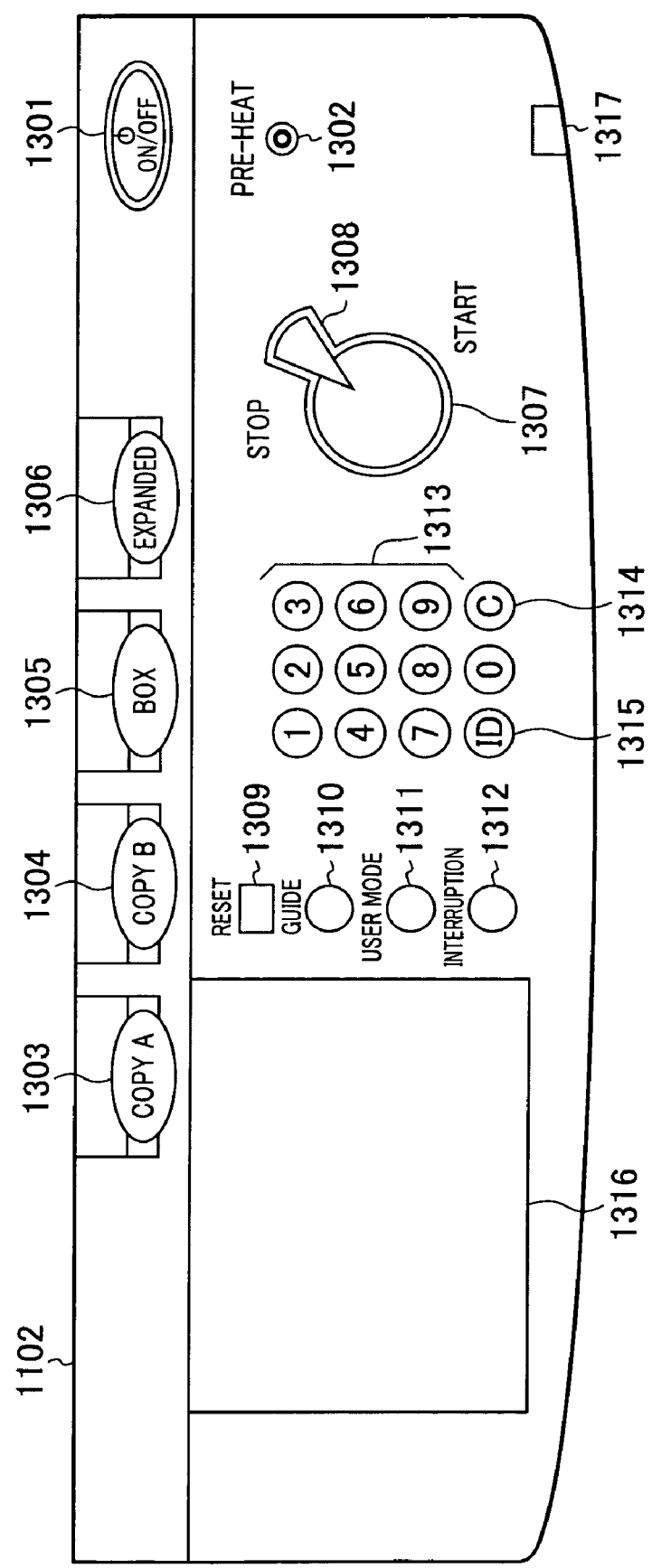
FIG. 12 is a plan view which illustrates an example of the key arrangement on an operating unit of a digital copier shown in FIG. 11.

FIG. 12 is a plan view which illustrates an example of key arrangements for the operating unit 1102 of the digital photocopier main unit 1101 shown in FIG. 11.

In FIG. 12, reference numeral 1301 denotes a power switch, and controls supply of power to the main unit. Reference numeral 1302 denotes a pre-heat key, and is used for turning on/off of the pre-heat mode. Reference numeral 1303 denotes a copy A mode key which is used for selecting the copy A mode from the multiple functions. Reference numeral 1304 denotes a copy B mode key which is used for selecting the copy B mode from the multiple functions. The copy A and the copy B have the same copy functions. In the event that scanner reading has ended with one mode of the copy A mode and the copy B mode, input can be performed with the other mode thereof, and accordingly, two copy modes having the same functions are provided for ease of use for the user.

Reference numeral 1305 is a mailbox key, and is used for selecting the mailbox mode (which corresponds to the above-described box function) from multiple functions (such as the copy function, box function, facsimile function, printer function, and the like) included in the present image processing apparatus. The mailbox function is a function wherein a storage region is formed in memory (hard disk in the image memory unit 1107) within the copier for each user or each department as described in the first embodiment, PDL data input from an external device such as a host computer or the like, or the scan image data input from the reader unit, are stored in the storage region, and the user can output the stored data at a desired time. Note that an arrangement may be made wherein the PDL data is stored in the box (storage region) without conversion, or an arrangement may be made wherein the bitmap image data converted from the PDL data is stored in the box.

Reference numeral 1306 denotes an extension key, and is used for operating the PDL data. Each of keys 1303 through 1306 are also used for calling up each function screen of an LCD touch panel 1316 described later, so that the user can observe the state of each job from a display on the LCD touch panel 1316.

Reference numeral 1307 denotes a copy start key, and is used for starting copying. Reference numeral 1308 is a stop key, and is used for canceling or stopping copying. Reference numeral 1309 denotes a reset key, and serves as a key for restoring the state to the normal mode when in standby. Reference numeral 1310 denotes a guide key, and is used when the user wants to know each function. Reference numeral 1311 denotes a user mode key, and is used when the user changes basic settings of the system. Reference numeral 1312 denotes an interrupt key, and is used for interrupting a copy job to perform another copying job with higher priority or urgency. Reference numeral 1313 denotes a numerical keypad, and is used for inputting numbers. Reference numeral 1314 denotes a clear key, and is used for clearing the input numbers. Reference numeral 1315 denotes an ID key, and is used for changing the mode to the ID input mode at the time of the user using the photocopier.

Reference numeral 1316 denotes an LCD touch panel made up of a liquid crystal panel and touch sensors, wherein the setting screen is displayed for each mode, and furthermore, the user can perform various kinds of detailed setting by touching displayed keys. Furthermore, the LCD touch panel 1316 displays the state of running jobs, as well. Reference numeral 1317 is a tally light for indicating the state of network communication, and is lit green when in standby, blinks green during communication, and is lit red during network errors.

Figure 13:
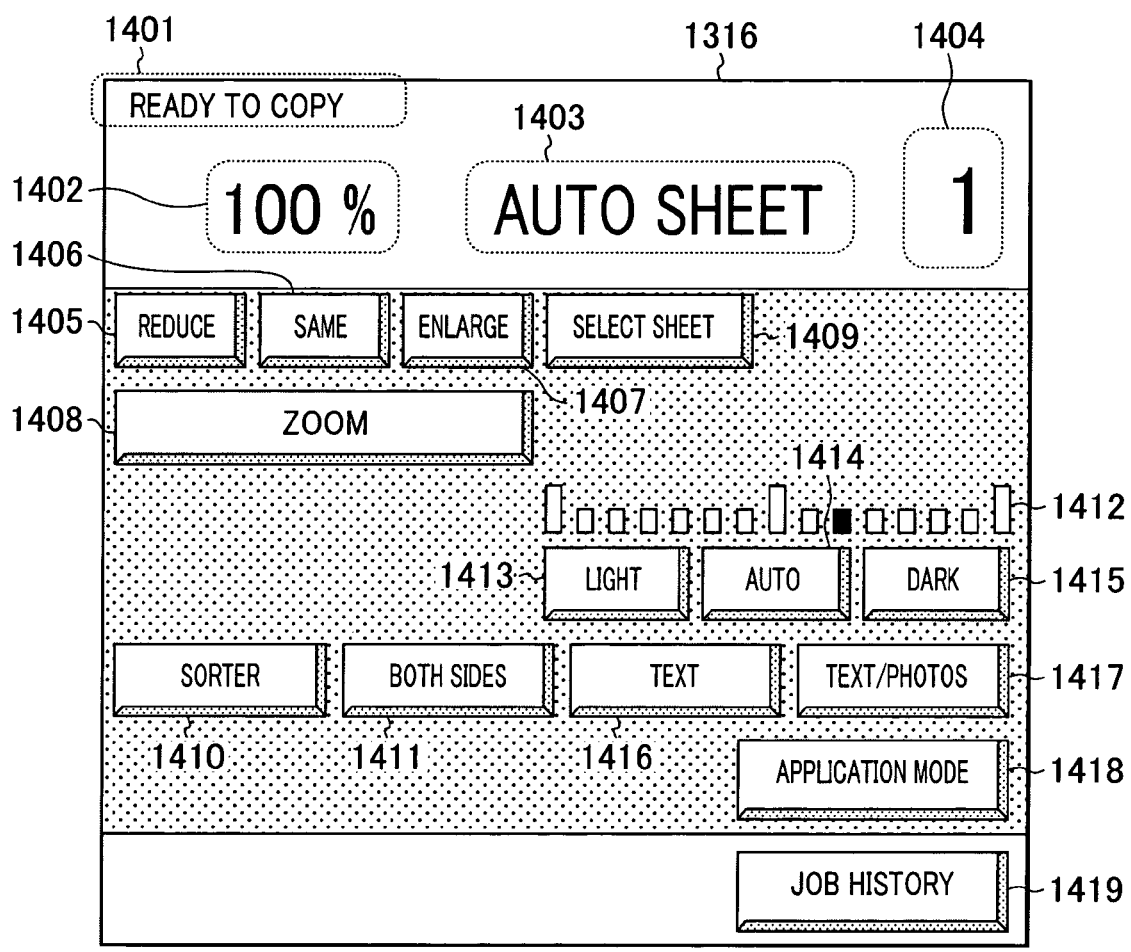
FIG. 13 is a diagram which illustrates a copy standard screen displayed on an operating panel shown in FIG. 12.

FIG. 13 is a diagram which illustrates a copy standard screen displayed on the LCD touch panel 1316 shown in FIG. 12. With the image processing apparatus according to the present embodiment, immediately following turning on, the copy standard screen is displayed as a default display.

In FIG. 13, reference numeral 1401 denotes a message line, and displays the state of copy jobs in the form of a message. Reference numeral 1402 denotes a portion showing the enlargement/reduction for displaying the enlargement or reduction specified by the user or automatically determined by the copy mode, in terms of percentage. Reference numeral 1403 denotes a sheet size display which displays the kind of the selected output sheet, and in the event that setting of the automatic sheet selection has been performed, the message "auto sheet" is displayed.

Reference numeral 1404 denotes a setting number display which indicates the number of the printed sheets for each copied original document sheet. Reference numeral 1405 denotes a reduction copy key which is used for making reduced copies. Reference numeral 1406 denotes a same-size copy key which is used when the user wants to return the mode to the same size mode in the event that the reduction copy mode or the enlargement copy mode has been selected. Reference numeral 1407 denotes an enlargement key which is used for making enlarged copies.

Reference numeral 1408 denotes a zoom key for making reduced copy or enlarged copies with magnification in small increments. Reference numeral 1409 denotes a sheet selection key which is used for selecting the kind of output sheet. Reference numeral 1410 denotes a sort key which is used for setting the mode for sorting or stapling.

Reference numeral 1411 denotes a double-sided key which is used for setting the double-sided mode. Reference numeral 1412 is an image-density display for indicating the current image density, wherein an image-density display 1412 pointing to the left side indicates that the image density is small, and conversely, the image-density display 1412 pointing to the right side indicates that the image density is great.

Furthermore, the image-density display 1412 changes according to operation of a light-tone key 1413 and a deep-tone key 1415. The light-tone key 1413 is used for reducing the image density. Reference numeral 1414 denotes an auto-density key which is used for selecting the mode for automatically determining the image density. The deep-tone key 1415 is used for increasing the image density.

Reference numeral 1416 denotes a text-document key which is used for setting the text-document mode for automatically adjusting the image density suitable for copying a character document. Reference numeral 1417 denotes a text/photo document key which is used for setting text/picture document modes for automatically adjusting the image density to that suitable for copying a document containing photographs.

Reference numeral 1418 denotes an advanced mode key which is used for setting various kinds of copy modes which cannot be set on the copy standard screen. Reference numeral 1419 denotes a print state key which is used for observing the current state of print performed in the present image processing apparatus 1101. The print state key 1419 is displayed at this position not only on the copy standard screen but also on any screen, and thus, the user can observe the state of print by pressing the key at any time.

Figure 14:
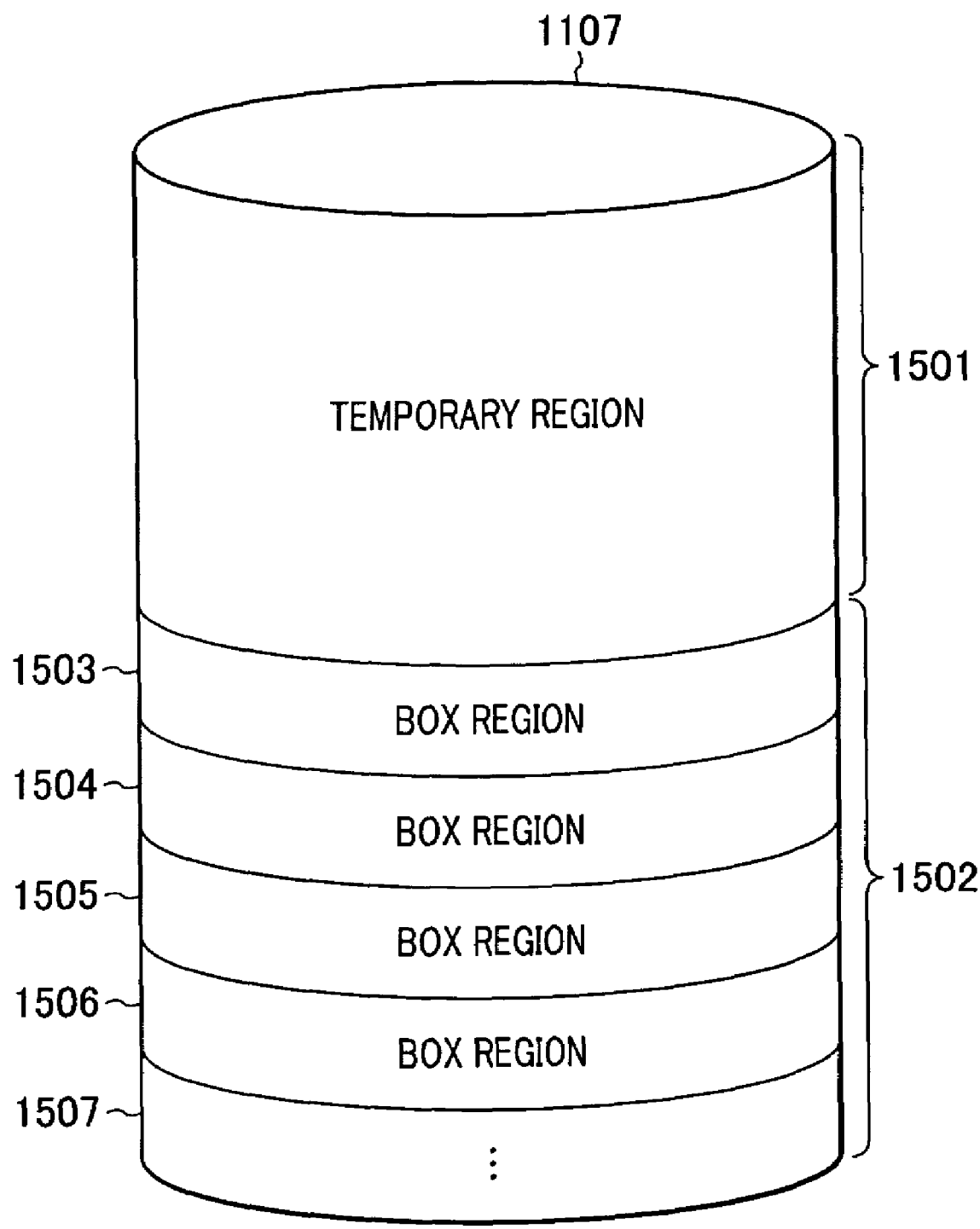
FIG. 14 is a diagram for describing logical partitioning for image memory shown in FIG. 11.

FIG. 14 is a diagram for describing a logical using method for the image memory unit 1107 shown in FIG. 11. With the present embodiment shown in FIG. 14, the storage region within a hard disk included in the image memory unit 1107 is logically partitioned into a temporary region 1501, a entire box region 1502, and the like, according to usage. The temporary region 1501 is a storage region for temporarily storing the data converted from the PDL data (jobs with the printer function) or the image data from a scanner (jobs with the copy function) in order to enable output processing such as processing for changing the output order of the image data, or processing for outputting multiple printed sheets for each copied document sheet by a single scan. That is to say, the region 1501 is a region suitable for performing electronic sorting or the like.

The entire box region 1502 is a storage region for using the box function, and is divided into the registered number of small storage regions such as regions 1503 through 1507 (e.g., with the first embodiment, the entire box region is divided into 100 boxes). The box regions 1503 through 1507 are assigned for each user or each company department or the like, and a box name and a password can be applied to each box. The user can input a PDL job or a scan job to a desired box by specifying the box, and can check the actual data stored in the box (preview function of the box function), change setting, or perform printout, by inputting the password.

Figure 15A:
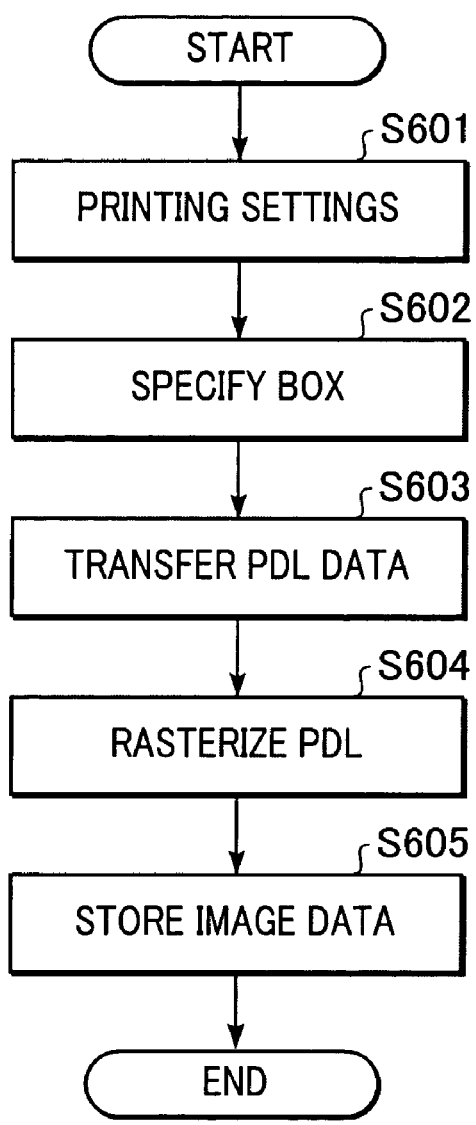
FIGS. 15A and 15B are flowcharts showing an example of a second data processing procedure for the image processing apparatus according to the present invention.

FIG. 15 is a flowchart which illustrates an example of the second data processing procedure for the image processing apparatus according to the present invention, which corresponds to a procedure for registering a job to a box, wherein registration of the data to a box is performed by the PDL image registration processing (FIG. 15A) for the data from the host computer 1109 shown in FIG. 11, and registration processing for the scan image from the scanner shown in FIG. 5B. Reference numerals S601 through S609 denote the steps.

In the event of registering a PDL image as shown in FIG. 15A, in Step S601, print settings serving as output conditions are made on the host computer 1109, and also the box function is selected by the user, following which the flow proceeds to Step S602. Note that the contents of the print setting include the number of copies, the size of the recording sheet, magnification, one-sided/double-sided, page output order, sorting output, whether or not to staple, and the like.

Subsequently, in Step S602, the user specifies a desired box number on the host computer 1109, and accordingly, a corresponding region within the entire box region 1502 of the image memory unit 1107 is specified, following which the flow proceeds to Step S603. For example, in the event of setting the box number BOX No. to BOX1, the box region 1503 of the entire box region 1502 is specified.

Subsequently, in Step S603, the user sets printing instructions at the host computer 1109, and at the same time, the driver software installed in the host computer 1109 converts the code data, which is to be printed, into the PDL data, and the PDL data is transmitted to the control unit 1108 of the present image input/output apparatus 1108 along with the printing setting parameters specified in Step S601, following which the flow proceeds to Step S604.

Subsequently, in Step S604, the transmitted PDL data is converted (rasterized) into image data, and in the event that the conversion of the image data has ended, the flow proceeds to Step S605.

Subsequently, in Step S605, the converted image data is stored in the box specified by the user, of the box region 1502 in the hard disk included in the image memory unit 1107 in serial order. For example, in the event that the user has selected a box with the box number BOX No. of BOX1, the image data is stored in the box region 1503 (the box with the box number BOX No. of BOX1), following which the processing ends.

Note that the print settings parameters specified in Step S601 are stored in the box region (in this case, box region 1503) specified by the user, as well. In the event that the user specifies the box with the box number BOX No. of BOX2, the data is stored in the box region 1504, and in the event that the user specifies the box with the box number BOX No. of BOX3, the data is stored in the box region 1505.

Figure 15B:
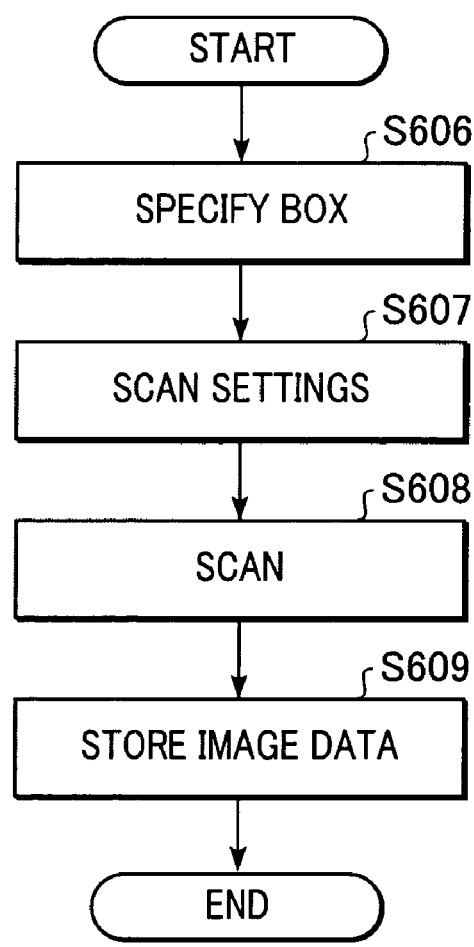

In the event that the user registers a scan image as shown in FIG. 15B, first of all, the user selects the box function by pressing the box key 1305 on the operating unit 1102, and subsequently, the user specifies the box number BOX No. for inputting the image in Step S606 on the setting screen for the box function displayed on the display unit 1316 on the operating unit 1102, following which the flow proceeds to Step S607.

Subsequently, in Step S607, the user specifies the scan setting such as image processing, and the flow proceeds to Step S608. In Step S608, the reader unit 1103 reads out the original document according to the instructions of "scan" and "start", and the flow proceeds to Step S609. In Step S609, the image read out in Step S608 is stored in the box region specified in Step S606, and subsequently, the processing ends.

Figure 16:
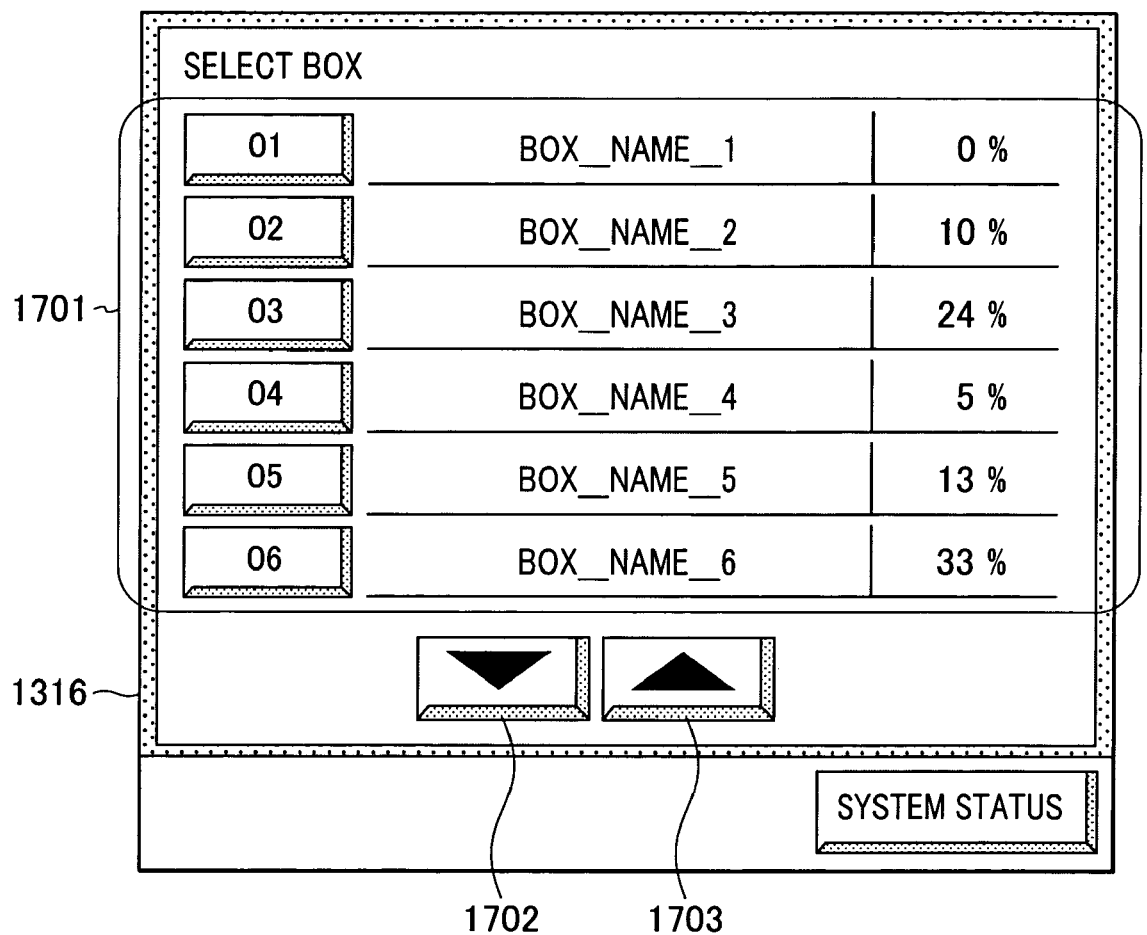
FIG. 16 is a diagram which illustrates an example of an operating screen displayed on an LCD touch panel shown in FIG. 13.
Figure 17:
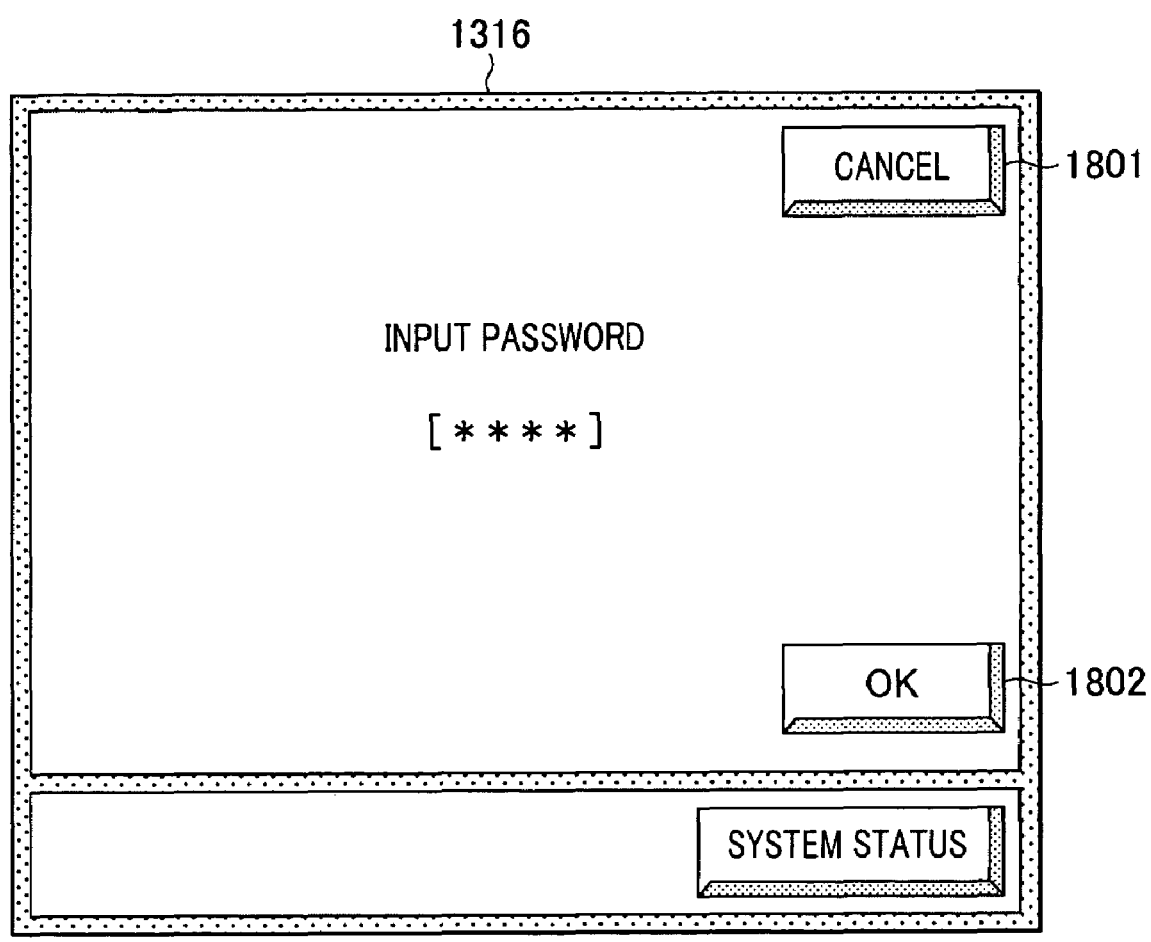
FIG. 17 is a diagram which illustrates an example of an operating screen displayed on the LCD touch panel shown in FIG. 13.
Figure 18:
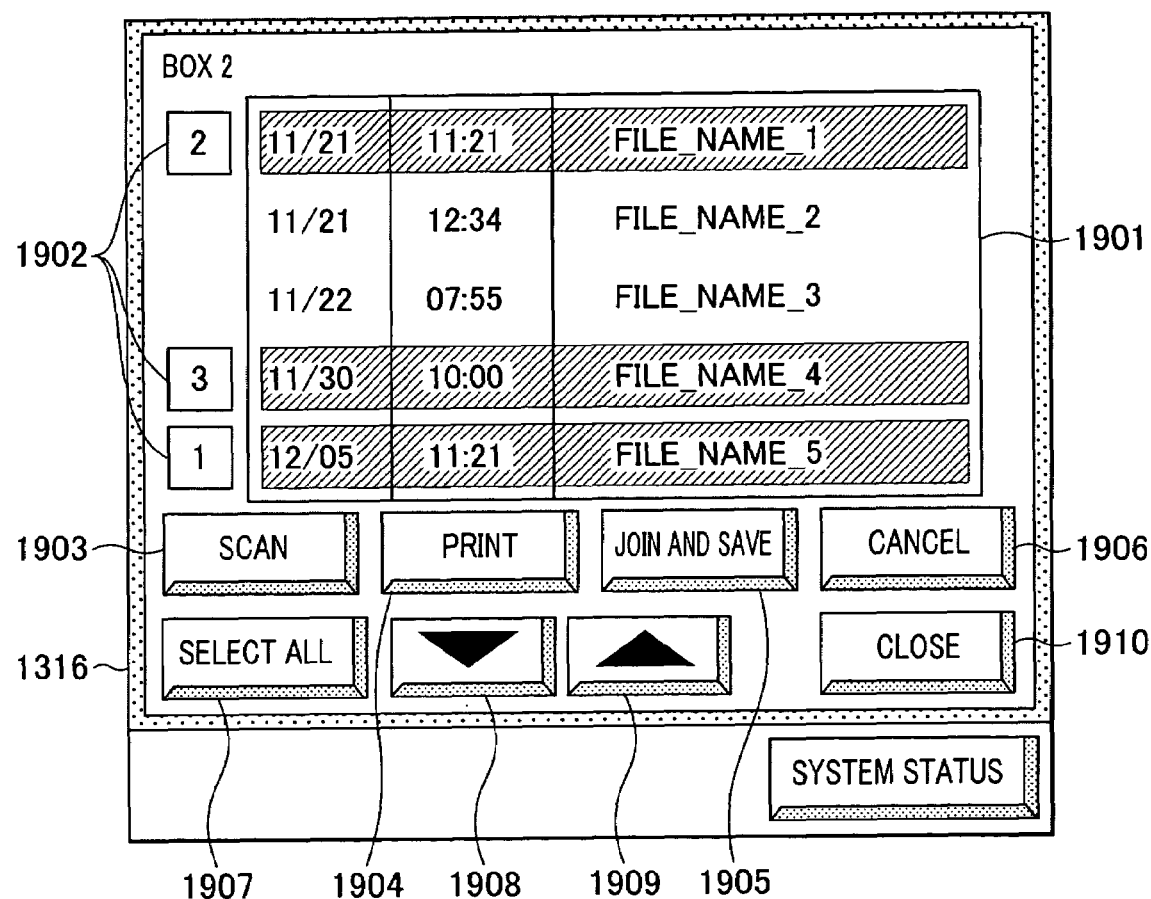
FIG. 18 is a diagram which illustrates an example of an operating screen displayed on the LCD touch panel shown in FIG. 13.

FIGS. 16 through 18 are diagrams which illustrate an example of an operating screen displayed on the LCD touch panel 1316 shown in FIG. 13 under the control by the control unit 1108, and corresponds to an example of the operating screen for the box function displayed on the LCD touch panel 1316 at the time of the user pressing the box key 1305 on the operating unit 1102, for example.

Upon the user pressing the box key 1305 on the operating unit, the screen shown in FIG. 16 is displayed. The box selecting screen shown in FIG. 16 includes a box number (BOX No.) key, a display unit for displaying the box name, and a display unit for displaying the information with regard to the capacity of the box as to the entire box region 1502, on a display region 1701. Reference numerals 1702 and 1703 denote scroll keys which are used for scrolling the screen in the event that the number of the registered boxes exceeds the number of boxes which can be displayed on the display region 1701 at one time.

Now, upon the user selecting one of the boxes by pressing one of the box No. keys in the display region 1701, the next operating screen is displayed. In the event that the user selects from the screen shown in FIG. 16 a box for which a password has been set, the next operating screen which comes up is the password input screen shown in FIG. 17. On the other hand, in the event that the user selects from the screen shown in FIG. 16 a box for which a password has not been set, the password input screen shown in FIG. 17 does not come up, and the display directly proceeds to the operating screen shown in FIG. 18, which will be described later.

Inputting the correct password in the password input screen shown in FIG. 17 brings up the in-box screen shown in FIG. 18 for the operating screen, so the user can access the box.

In the event that the user inputs an incorrect password in the operating screen shown in FIG. 17, an unshown warning screen is displayed, and the box cannot be accessed. Reference numeral 1801 denotes a cancel key used for returning to the operating screen display shown in FIG. 16. Reference numeral 1802 denotes an OK key used for okaying the input password, following which the input password is verified by the control unit 1108.

In the in-box screen shown in FIG. 18, reference numeral 1901 denotes a list of documents in the box, with the date and time of registration, and the file name, of each of the documents listed. To select a document, the user presses a file name, which causes the selected document to be displayed in an inverted manner. This is a toggle action, wherein pressing the selected file name again cancels the selection. Thus, the display portion 1901 (document list space) included in the operating screen shown in FIG. 18 serves both as an information display portion for displaying document information, and an operation instructing portion for the user to select the documents to be output. Also, as shown in the operating screen in FIG. 18, multiple jobs can be selected in the document list space 1901 (three documents have been selected in this example). Of course, the user may select just one document. Note that a key 1907 is provided to select all of the documents in the document list space 1901 with a single action, doing away with the need to select one document at a time.

Reference numeral 1902 denotes displays illustrating the order in which the documents were selected. In the example shown in FIG. 18, the user is notified that the multiple jobs were selected by the user in the order of file name 5, file name 1, and file name 4. This order is the order in which the documents are printed, joined, and/or deleted.

Reference numeral 1903 denotes a scan key, used for inputting images from a scanner (the reader unit 1103) to the currently-opened box, and pressing this brings up an unshown scan setting screen. In the event that a new document is stored in the box by pressing the scan key 1903, the document is registered following the jobs currently registered to this box. For example, in the event that there are just five jobs registered in the box, the newly-scanned document will be registered following the job with the file name 5.

Reference numeral 1904 denotes a print key, used for printing documents selected in the document list 1901. Pressing the key 1904 displays the screen shown in FIG. 20.

In FIG. 18, reference numeral 1905 denotes a join-and-save key, used for storing multiple documents as a single document. For example, with the example shown in FIG. 18, in the event that the join-and-save key 1905 is pressed by the user in the state that the documents with the file name 4, file name 1, and file name 4 are selected as shown in FIG. 18, the control unit 1108 effects control so as to join the job with the file name 5, the job with the file name 1, and the job with the file name 4, as a single job, and to store the generated joined data in the box. In the event that the joined job is to be stored in place of the three jobs, the three jobs are deleted from the memory and the joined job is stored instead. In the event of storing the joined job as a new job, the three original jobs are left in the memory and the joined job is registered in the box.

Reference numeral 1906 denotes a delete key, used for deleting all of the selected documents displayed in the document list 1901. For example, in the event that the user presses the delete key 1906 in the displays state shown in FIG. 18, the control unit 1108 effects control so as to delete the three jobs from the box (i.e., from the hard disk).

Reference numeral 1907 denotes a select all key, used for selecting all of the documents in the document list 1901. In the event that the select all key 1907 is used, the order of selection is the order of listing in the document list 1901.

Reference numerals 1908 and 1909 denote scroll keys, used for scrolling the screen in the event that the number of documents stored exceeds the number of documents which can be displayed in the document list 1901 (in this example, more than five) so that the user can view the others as well. Reference numeral 1910 denotes a close key, used for returning from the screen display shown in FIG. 18 to the screen display shown in FIG. 17.

Figure 19:
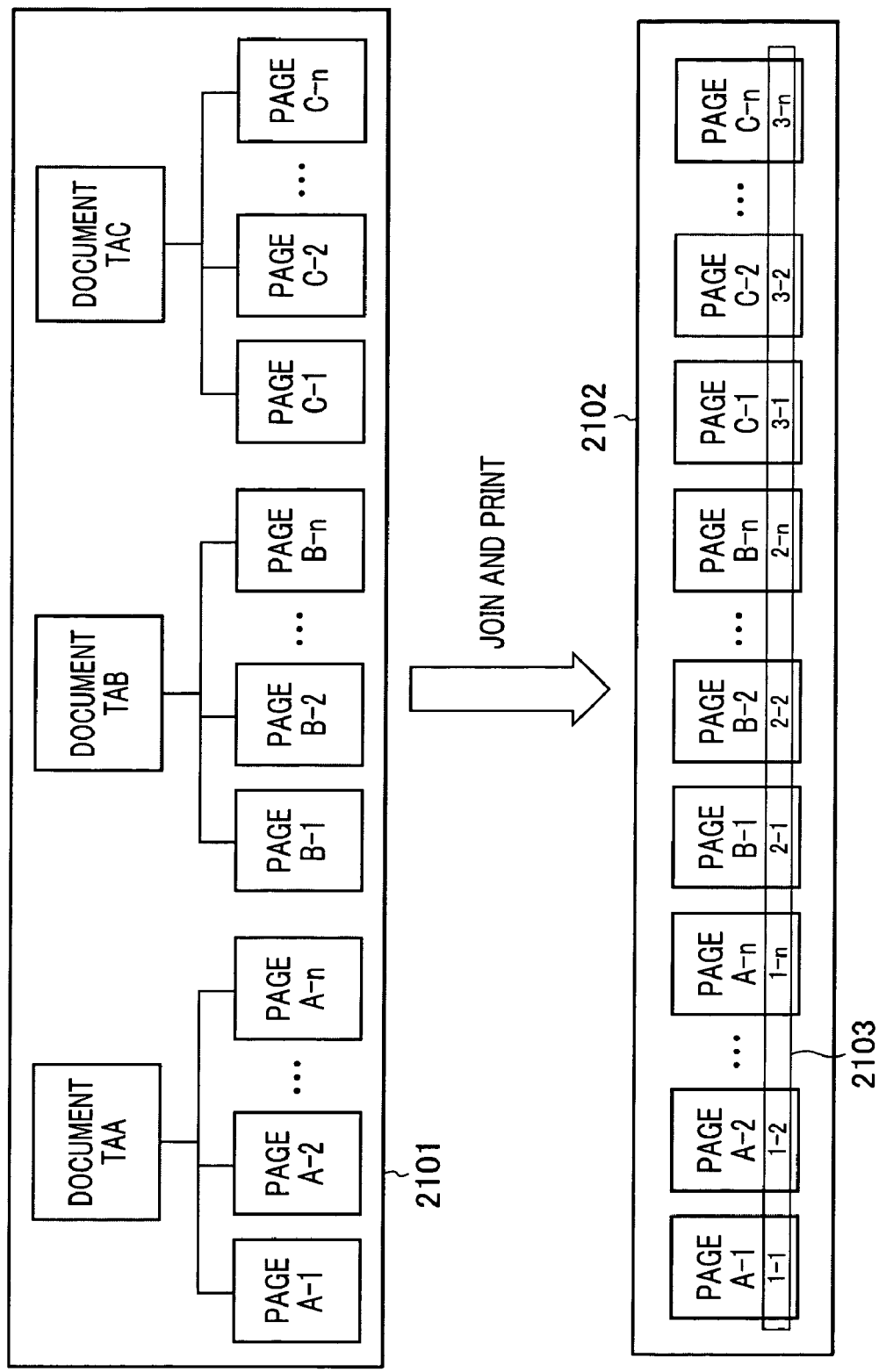
FIG. 19 is a diagram which illustrates the results of printing a joined document by the image processing apparatus according to the present invention.

FIG. 19 is a diagram illustrating the results of printing joined documents with the image processing apparatus according to the present invention, showing an example of output results of page printing a joined document by chapters, managed by later-described management tables TA through TC.

In FIG. 19, reference numeral 2101 illustrates a the structure of the documents stored in the box region (see FIG. 14). Note that the management information may be stored in the box area in the hard disk or at another area, or may be stored in separate memory. Any arrangement is suitable as long as the management information can be stored and managed in a manner correlated with the selected jobs, and can be called up by the control unit 1108 as necessary. Here, documents TAA through TAC each denote management tables for the respective documents, with the management information of the management tables TAA through TAC including the number of copies, finishing information such as stapling and the like, the number of pages in the document and so forth, and printing attributes of the overall document.

Also, the pages A-1 through A-n, B-1 through B-n, and C-1 through C-n, each denote that management tables for each of the documents, storing the resolution of each page, printing attributes relating to the page such as the number of pixels and so forth, the file ID of the actual image, and so forth. Also stored is attributes information such as both-side information relating to which of the front and back sides to print on, which sheet tray to supply sheets of which size from, and so forth.

The example shown in FIG. 19 shows joined printing of the three documents, wherein Document A, Document B, and Document C are to be joined in printing, the documents selected in the order shown in FIG. 18. In the example shown in FIG. 18, the documents have been selected in the order of the job with the file name 5, the job with the file name 1, and the job with the file name 4, so here, Document A corresponds to the job with the file name 5, Document B corresponds to the job with the file name 1, and Document C corresponds to the job with the file name 4.

Reference numeral 2102 illustrates the order in which the pages are output in the joined printing, which is in the order of pages A-1 through A-n of Document A, pages B-1 through B-n of Document B, and pages C-1 through C-n of Document C. Reference numeral 2103 shows the results of printing pages by chapter, regarding what sort of page numbers are printed on each page of the pages A-1 through C-n. With the present embodiment, the chapter numbers and page numbers are printed in the format of "Chapter No.-page No.", and the chapter number is automatically incremented for each document previous to joined printing. In the example in FIG. 19, the chapter numbers are incremented for each document previous to joined printing, so the chapter number for the pages belonging to Document A is 1, the chapter number for the pages belonging to Document B is 2, and the chapter number for the pages belonging to Document C is 3. Further, the pages in each chapter have sequential page numbers assigned from 1 through n.

FIGS. 20 through 23 are diagrams illustrating an operating screen example displayed on the LCD touch panel shown in FIG. 13, corresponding to the print settings screen example. This screen comes up upon pressing the print key 1904 shown in FIG. 18. Note that this is an example of how various operating screens having touch panel keys are displayed on the display portion of the operating unit in response to user operations, under the control of the control unit 1108.

Figure 20:
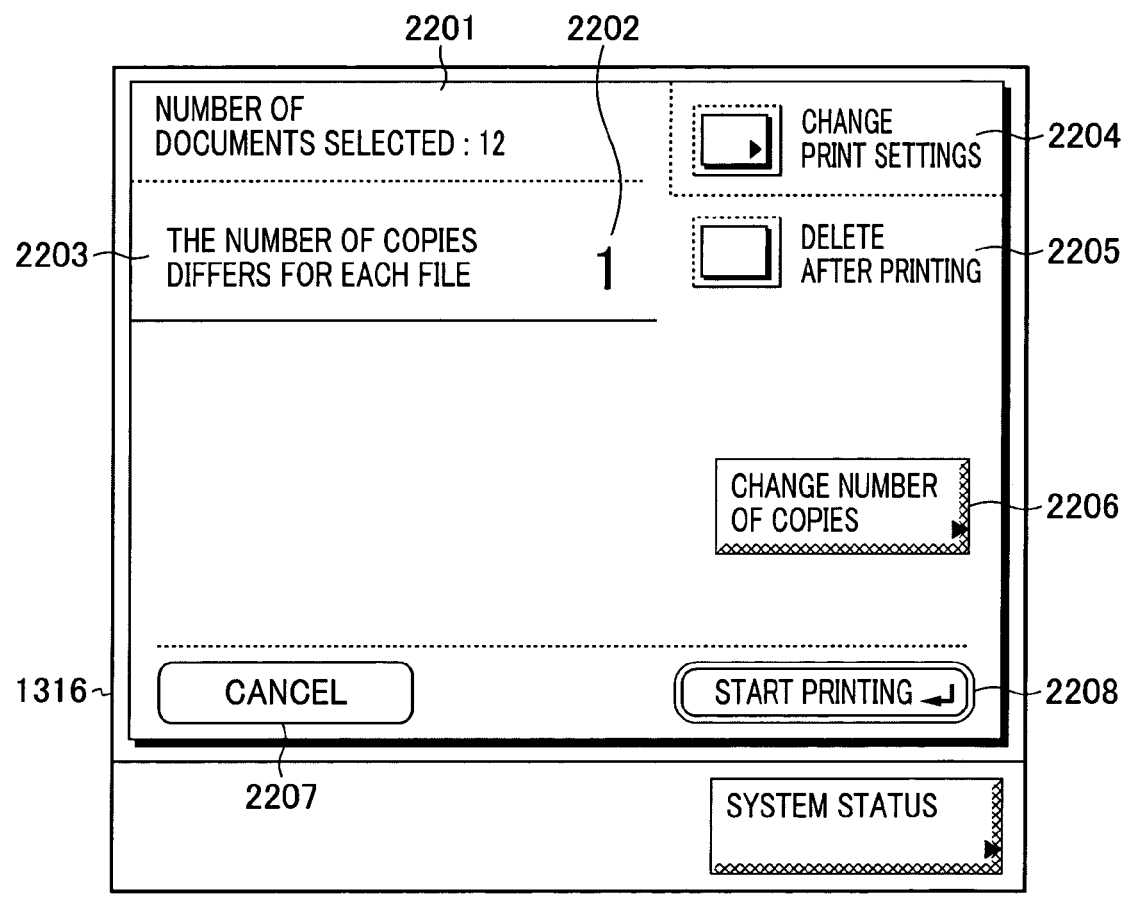
FIG. 20 is a diagram which illustrates an example of an operating screen displayed on the LCD touch panel shown in FIG. 13.

In FIG. 20, reference numeral 2201 denotes a display area indicating the number of documents selected, which shows how many documents are to be printed. In this case, the display indicates that 12 documents have been selected in the screen shown in FIG. 18. Reference numeral 2202 denotes a portion indicating the number of copies, which is the default value 1 in this case.

Figure 21:
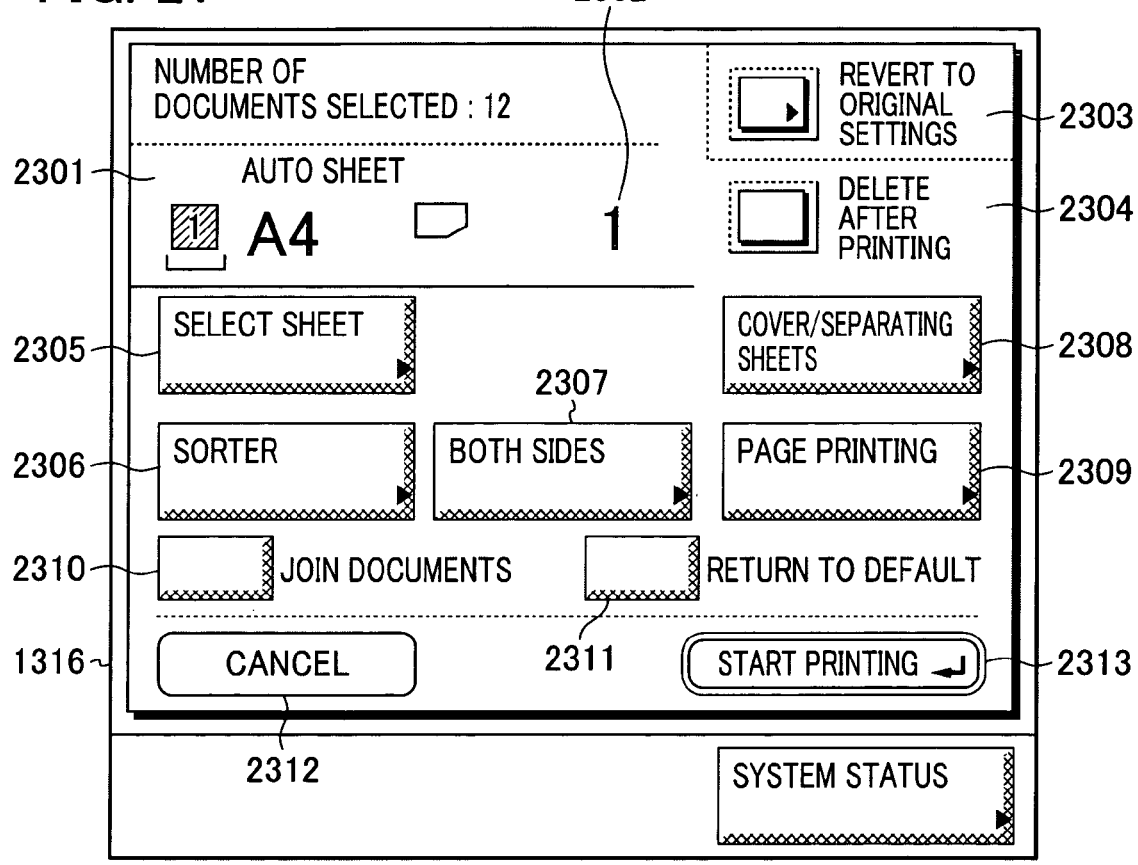
FIG. 21 is a diagram which illustrates an example of an operating screen displayed on the LCD touch panel shown in FIG. 13.

Also, the user can freely set the number of copies to be printed using the key 2206 in this screen. Reference numeral 2203 denotes a display area where a warning display is made in the event that there is even one document which is different in the number of copies from the other selected documents. In the event that, unlike this example, the number of copies for all of the documents is the same, the warning display is not made in the display area 2203. In the event that the document joining described with reference to FIG. 21 is not to be carried out, a default number of copies is output with only a warning, and in the event of joining the documents, the copies of the number displayed at the display area 2202 are output. That is to say, even in the event that multiple documents are selected and the number of copies set beforehand do not match, only a warning display is made, and output can be made with the number of copies adjusted (either set to the default 1, or set to a new value with the key 2206), without forbidding the output processing itself. The key 2204 is a print settings changing key, and upon pressing this key the display screen changes to that shown in FIG. 21, where further detailed printing settings can also be made besides changing the number of copies.

Of course, in the event that there is no need to change the detailed settings relating to the output conditions of the selected documents, or the number of copies thereof to be output, the user will press the print start key 2208 instead of pressing the keys 2204 or 2206 or the like. Upon the print start key 2208 being pressed, the control unit 1108 effects control so as to print the documents selected in the operating screen shown in FIG. 18 in the order of selection, following the output conditions set beforehand for the selected documents.

Reference numeral 2205 denotes a key for setting whether or not to delete the source document following printing. The key 2205 is toggled on and off each time it is pressed. Reference numeral 2206 denotes a copy number changing key, and upon being pressed an unshown numerical keypad is displayed to allow the number of copies displayed in the display area 2202 to be changed.

Reference numeral 2207 denotes a cancel key, used for quitting this screen, and reference numeral 2208 denotes a print start key for starting printing. In this case, the multiple documents selected in the screen shown in FIG. 18 are not joined but printed as they are according to the number of copies shown in the display area 2202.

The print settings changing screen shown in FIG. 21 is a screen to be displayed on the operating unit in the event that the user presses the print settings changing key 2204 in the operating screen shown in FIG. 20, and is an operating screen to allow the user to set again the output conditions for the jobs selected with the settings screen shown in FIG. 18.

The portion indicated by reference numeral 2301 on the operating screen in FIG. 21 illustrates a display portion which lets the user recognize the sheet supply tray from which sheets for the document to be printed will be supplied, and the size of the sheets. In the event that there are multiple sheets sizes in a single document, a display is made in this display portion to that effect. The auto sheet display in the sheet size display indicates that the sheet supply tray from which the sheets are to be supplied is to be determined based on the sheet size of the source document, rather than a sheet supply tray explicitly specified by the user.

The portion indicated by reference numeral 2302 on the operating screen in FIG. 21 illustrates a display portion which lets the user recognize the number of copies presently set. The portion indicated by reference numeral 2303 on the operating screen in FIG. 21 illustrates an operating key whereby the user can return the settings to the previous settings, and in the event that the operating the key 2303 is pressed by the user, control is effected such that the printing settings for the selected job specified by the user using the operating screen is returned to the settings for the source document before the output conditions were set using the operating screen.

The portion indicated by reference numeral 2304 on the operating screen in FIG. 21 illustrates a setting key which lets the user make settings regarding whether or not to delete the source document of the selected job from the box following printing of the selected job to be output. Reference numeral 2305 denotes a sheet selection key, used for printing with a fixed sheet supply tray selected by the user. Reference numeral 2306 denotes a sorter key, for approving finishing such as stapling, hole punching, and so forth.

Reference numeral 2307 denotes a both-side key, which enables both-side settings to be made, and 2308 denotes a cover/separating sheets key, which can be used for making settings for inserting covers, inserting sheets, and separating sheets. The term "separating sheets" as used here means a function for supplying an inserting sheet between documents in the event that multiple documents selected in the screen shown in FIG. 18 are to be joined and output. Of course, an arrangement may be made wherein the user can set whether or not to print the first page of each of the documents on the separating sheets.

The portion indicated by reference numeral 2309 on the operating screen in FIG. 21 illustrates a page printing key which lets the user make settings regarding functions for automatically printing page numbers. In the event that this key 2309 is pressed by the user, the control unit 1108 effects control such that the display state of the display portion changes to the screen display shown in FIG. 22.

The portion indicated by reference numeral 2310 on the operating screen in FIG. 21 illustrates a document joining settings key, while allows the user to select whether or not to join the documents selected by the user using the operating screen shown in FIG. 18 and performing printing output thereof as a single document (i.e., as a single job). In the event that document joining is selected with the key 2310, the control unit 1108 effects control such that the multiple documents selected with the operating screen shown in FIG. 18 are joined as a single job in the output order specified in the screen shown in FIG. 18 and according to the output conditions set in the screen shown in FIG. 21, and the joined job that has been generated thus is printed. Accordingly, the multiple jobs can be subjected as a batch to stapling processing, both-side printing, sorted into the same discharge tray, and so forth, as a single job. This key is toggled on and off, and is displayed inverted when selected, indicating that the documents are to be joined. In the state shown in FIG. 21, this key is not displayed inverse, meaning that the function is off and settings are for the documents not to be joined. In the event that the print key 2313 is pressed in a state that document joining is not selected with the key 2310 following the multiple documents being selected on the screen shown in FIG. 18, the control unit 1108 effects control such that the multiple documents selected with the operating screen shown in FIG. 18 are separately output in the output order specified in the screen shown in FIG. 18, as individual documents. Accordingly, the multiple jobs can be subjected to stapling processing, both-side printing, sorted into separate discharge trays, and so forth, each as individual jobs.

The portion indicated by reference numeral 2311 on the operating screen in FIG. 21 is a key for reverting to the initial values (default values) for the output conditions, and is pressed to cancel the items set in the screen and return to the state of the screen when initially brought up. Reference numeral 2312 denotes a cancel key, pressed to invalidate the settings and return to the screen shown in FIG. 20. Reference numeral 2313 denotes a print start key, and pressing this print start key effects control so as to enable the settings in this screen and start the printing of the documents selected in the screen shown in FIG. 18.

Figure 22:
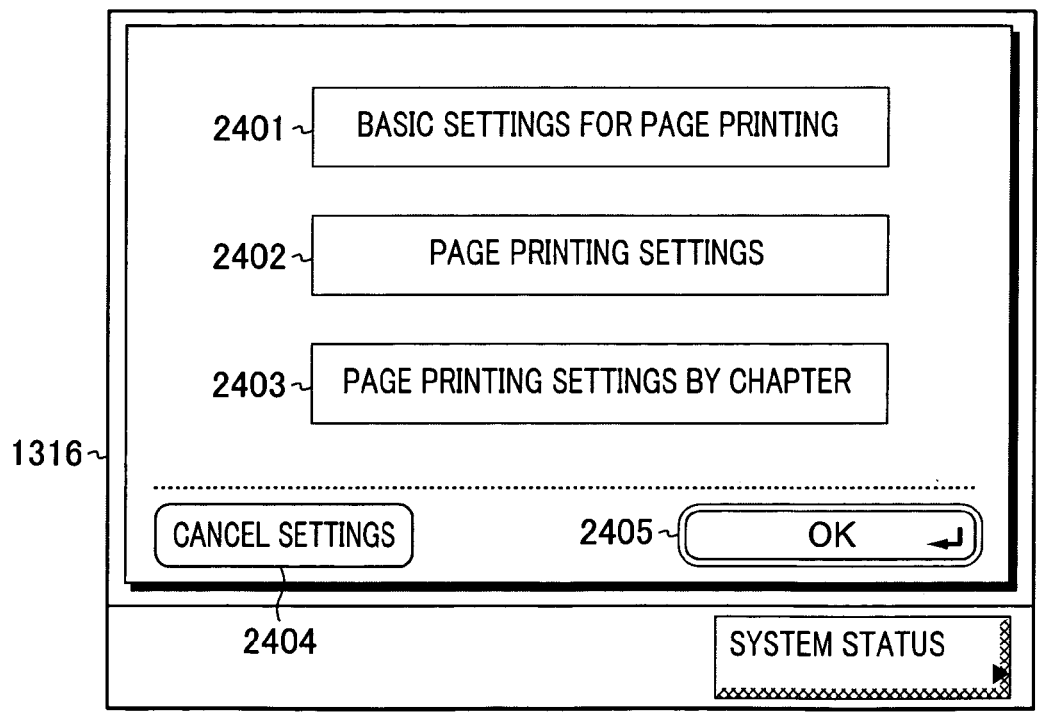
FIG. 22 is a diagram which illustrates an example of an operating screen displayed on the LCD touch panel shown in FIG. 13.

The page printing settings screen shown in FIG. 22 is a screen displayed on the display unit in the event that the page print key 2309 on the operating screen shown in FIG. 21 is pressed by the user, and serves as an operating screen to perform page printing settings regarding jobs selected with the screen shown in FIG. 18 within the boxes selected by the user with the screen shown in FIG. 16.

The portion indicated by reference numeral 2401 on the operating screen in FIG. 22 is a page printing basic settings key, and upon the user pressing the key 2401 in a case of setting items common to page printing functions, the control unit 1108 effects control so as to display an operating screen (not shown in the display unit), this operating screen having an operating key whereby the user can set the position for printing page numbers, an operating key whereby the user can set whether or not to count inserting sheets and separating sheets as pages, an operating key whereby the user can set the printing font, font size, and printing concentration, of the data of the page number to be assigned to the document data, and so forth. Thus, the user can set various types of processing conditions relating to page information to be assigned to the jobs with the box functions, and the control unit 1108 effects control so as to generate the page number data following the settings and to provide this generated data to the document data to be output, so that the page number data is output on the document data.

The portion indicated by reference numeral 2402 on the operating screen in FIG. 22 is an operating key for performing page printing settings, and is used for making settings in the event of performing page printing other than by chapter. In the event that the key 2402 is pressed, the control unit 1108 effects control so as to display an operating screen (not shown) which allows the user to set how the page numbers will be noted (numbering notation format) and so forth. The user can select the numbering notation format from multiple types of page number data notation format, including, for example, "-page No.-" (first notation format), "-page No./total number of pages-" (second notation format), and so forth, using the operating screen. This means that, the notation format for a page number to be assigned to document data of the N'th page in document data made up of M pages can be output in notations formats such as "-N" or "N/M", for example.

The portion indicated by reference numeral 2403 on the operating screen in FIG. 22 is a key for printing pages by chapters, operated by the user to set page printing to a format such as "chapter number—page number" (third notation format), for example.

In the present embodiment, the operating key 2403 is valid only in the event that multiple documents have been selected with the screen shown in FIG. 18. For example, in the event that multiple jobs are selected with the screen shown in FIG. 18 from the jobs stored in the boxes selected by the user with the screen shown in FIG. 16, and document joining settings have been made regarding these selected multiple jobs by pressing the key 2310 in the operating screen shown in FIG. 21, the control unit 1108 effects control so as to display the operating key 2403 shown in FIG. 22 in a state selectable by the user, i.e., so as to permit page printing by chapters (although this processing is never executed unless requested by the user, as a matter of course). On the other hand, in the event that a single job is selected with the screen shown in FIG. 18 from the jobs stored in the boxes selected by the user with the screen shown in FIG. 16, the control unit 1108 effects control so as to display the operating key 2403 shown in FIG. 22 in a state not selectable by the user, i.e., so as to forbid page printing by chapters.

As an example of display control to allow the operating key 2403 to be selected by the user, the operating screen shown in FIG. 22 having at least the key 2403 is displayed on the display unit, and the key 2403 is made available to the user, so as to enable instruction of executing of the processing. On the other hand, as an example of display control to not allow the operating key 2403 to be selected by the user, an operating screen other than that shown in FIG. 22, at least not having the key 2403 but having only the keys 2401 and 2402 is displayed on the display unit instead of the operating screen shown in FIG. 22, for example. In this case, the key 2403 is not displayed on the operating screen at all, so of course the user cannot press the key 2403. Also, an arrangement may be made wherein the operating screen having the key 2403 such as shown in FIG. 22 is displayed, but the key 2403 is displayed so as to be grayed out or hatched, and placed in a state so as to not respond to the user pressing the key 2403 (i.e., a disabled state). In any case, an arrangement wherein the key 2403 cannot be pressed by the user and execution of page printing by chapters is forbidden, in the event that only one job has been selected in the screen shown in FIG. 18, is sufficient.

The reason why such control is performed will be described now. With the box functions in the present embodiment, multiple jobs can be stored. At the time of box output, the user can set either a single job or multiple jobs for output (see the user interface in FIG. 18). Also, the jobs stored in the boxes are originally independent and separate jobs to begin with, as described above. Accordingly, in the event that the user uses the user interface shown in FIG. 18 to select multiple jobs, there is a high probability that these jobs will be joined using the screen shown in FIG. 19 and so forth so as to be handled as a single job, and in such cases of forming joined documents, in the event that the user requests assigning of page number data by using the key 2309 shown in FIG. 19, there is a high probability that the user is desiring to print the output results in chapters, with each individual job being Chapter 1, Chapter 2, and so forth, for example. Accordingly, the key 2403 is also subjected to display control. That is to say, in the event that the user only selects one job, the job is an individual job to begin with, so there is little chance that the user desires to make a request to print the job by chapters at the time of job output form a box. However, if the display is arranged such that the key 2403 is available at all times, the user may mistakenly assume that printing by chapters can be performed even if only one job is selected with the operating screen in FIG. 18, and accordingly the key 2403 is set in a disabled state to prevent such misunderstanding and erroneous operations in the event that only one job is selected.

Further, an arrangement may be made wherein control to execute page printing by chapters using the key 2403 in FIG. 22 is effected in the event that the user selects multiple jobs with the operating screen in FIG. 18 and also uses the key 2310 to instruct joining of documents, and wherein control to forbid page printing by chapters using the key 2403 in FIG. 22 is effected in the event that the user selects multiple jobs with the operating screen in FIG. 18 but does not use the key 2310 to instruct joining of documents. In either case, an environment which is handier and has greater ease of use for the user should be provided.

Figure 23:
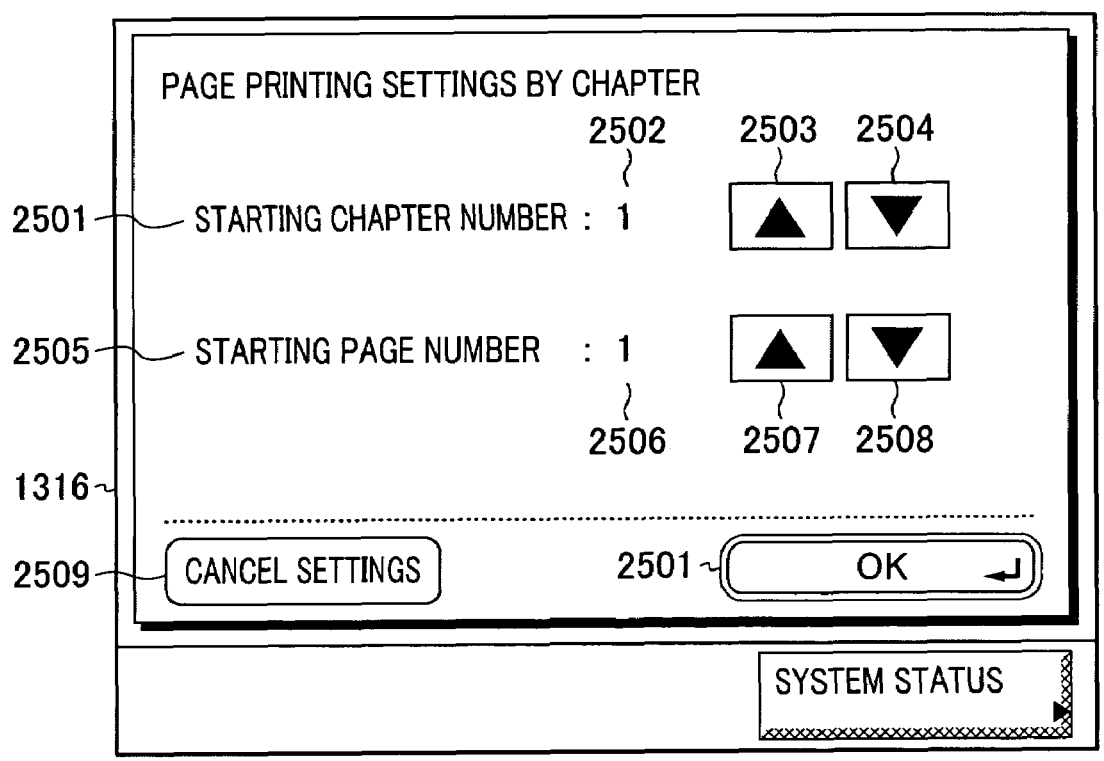
FIG. 23 is a diagram which illustrates an example of an operating screen displayed on the LCD touch panel shown in FIG. 13.

In the event that the key 2403 for printing pages by chapters in the operating screen shown in FIG. 22 is pressed by the user, the control unit 1108 effects control so as to change the screen display state to that shown in FIG. 23.

Reference numeral 2404 denotes a settings cancel key, used to clear the settings in this screen and return to the previous screen, and 2405 denotes an OK key which is used to make the settings in this screen valid and pass therethrough.

As described in the previous embodiment, the image processing apparatus according to the present embodiment effects control so as to enable execution of first processing (processing for assigning new page information (newest page information) to the original document data to be numbered, using the numbering functions; see the first embodiment for the details regarding the setting method, processing, control method, and so forth) following user instructions with the numbering setting screen in FIG. 3, and also so as to enable execution of second processing (processing for deleting already-existing page information (old page information) from the original document data to be numbered; see the first embodiment for the details regarding the setting method, processing, control method, and so forth) following user instructions with the numbering setting screen in FIG. 4.

Accordingly, an arrangement may be made for a case wherein the user selects a desired box from the multiple boxes using the operating screen shown in FIG. 16, selects desired jobs from the box using the operating screen shown in FIG. 18, and presses the key 2309 shown in FIG. 21 to display the operating screen shown in FIG. 22, such that the contents of the operating screens in FIGS. 3 and 4 can be displayed on the display unit according to user instructions through links provided, so that in the event that the user presses the key 2401 or the key 2402 for example, the control unit 1108 effects control so as to display the contents of the operating screens in FIGS. 3 or 4 on the display unit using the operating screen in FIG. 22. Or, an arrangement may be made wherein, instead of the operating screen shown in FIG. 22, an operating screen having further separate keys in addition to the keys 2401 through 2403, with control being made by the control unit 1108 upon pressing this key, to display the operating screen shown in FIG. 3 or the operating screen shown in FIG. 4. Thus, the control unit 1108 effects control to display the display the operating screen shown in FIG. 3 or the operating screen shown in FIG. 4 after displaying the operation screen by pressing the key 2309 in the operating screen shown in FIG. 21.

In the event that the user performs settings regarding the first processing using the setting screen shown in FIG. 3, the control unit 1108 effects control so as to subject the one or multiple jobs selected with the operating screen shown in FIG. 18 following the settings made with the operating screen shown in FIG. 3. Also, in the event that the user performs settings regarding the second processing using the setting screen shown in FIG. 4, the control unit 1108 effects control so as to subject the one or multiple jobs selected with the operating screen shown in FIG. 18 following the settings made with the operating screen shown in FIG. 4. Moreover, in the event that the user performs settings regarding the first processing using the setting screen shown in FIG. 3 and the second processing using the setting screen shown in FIG. 4, the control unit 1108 effects control so as to subject the one or multiple jobs selected with the operating screen shown in FIG. 18 following the settings made with the operating screen shown in FIG. 3 and with the operating screen shown in FIG. 4.

According to such an arrangement, at the time of outputting with the box functions, regardless of whether a single job or multiple jobs are selected with the setting screen shown in FIG. 18, or whether multiple jobs are selected and joining the documents is instructed, various types of output data such as shown in FIG. 6 through FIG. 8 can be generated. Also, in the event that the user does not need new page numbers for the job to be output from the box but would like to delete the page number information originally provided this job, the user selects a desired box from the screen shown in FIG. 16 and further selects a desired job or jobs using the screen shown in FIG. 18. Selecting "delete" with the key 401 in the screen shown in FIG. 4 specifying the range for deleting using the keys 403 through 409, and instructing starting of output upon completion of the settings, causes the control unit 1108 to effect control so that the page number information provided beforehand to the job selected in the screen in FIG. 18 (old page information, i.e., the page number data which the documents already had at the point of being stored in the box) is deleted from the document data, so the document data can be output from the box with the page information deleted therefrom.

Now, let us consider a case wherein the second processing is to be executed on multiple jobs selected as shown in the example in FIG. 18. There is the possibility that the page number data already provided to the jobs (the old page data) may be provided at different positions for each of the jobs. It can be clearly understood that such a situation necessitates a way for the user to instruct where the page number data to be deleted exists on each separate job.

For example, in the event there is the need to display on the display unit a settings screen for executing the second processing according to user instructions following displaying the screen shown in FIG. 22 due to the key 2309 shown in FIG. 21 having been pressed, the control unit 1108 checks the selection state of jobs selected with the operating screen shown in FIG. 18 at a point prior to displaying the display screen shown in FIG. 21, and in the event that multiple jobs have been selected, performs display control so as to enable specification of deleting positions using the keys 403 through 409 in the settings screen shown in FIG. 4, for each of the jobs selected with the screen shown in FIG. 18. Using the display example shown in FIG. 18 for description, in order of selection in the screen shown in FIG. 18, the page numbers provided to the document data of the job with the file name 5, to be output first, are at the lower left, so "lower left" is set with the key 406 for this job. The page numbers provided to the document data of the job with the file name 1, to be output second, are at the lower right, so "lower right" is set with the key 408 for this job. Further, the page numbers provided to the document data of the job with the file name 4, to be output third, are at the bottom, so "bottom" is set with the key 407 for this job.

Upon completing these settings and then instructing output, the control unit 1108 effects control so as to output the job with the file name 5, the job with the file name 1, and the job with the file name 4, in that order, with the page information positioned at the lower right for the document data with the file name 1 deleted, and with the page information positioned at the bottom for the document data with the file name 4 deleted, and also with the page information positioned at the lower left for the document data with the file name 5 deleted.

In the event that the user does not desire to manually instruct the positions to delete, the key 409 on the operating screen shown in FIG. 4 can be used to select "automatic specification". This causes the control unit 1108 to execute the aforementioned detection processing regarding where on each of the jobs the page information is positioned. As a result of the page information detection processing for each job, recognition is made that the page numbers are provided to the "lower left" for the job with the file name 5, to the "lower right" for the job with the file name 1, and to the "bottom" for the job with the file name 4, whereby page information deleting processing such as described above can be executed for the jobs, based on the detection results. This enables multiple box documents to be output with the page information of each deleted, the same as with the above-described arrangement.

Or, an arrangement may be made for a case wherein multiple jobs are selected with the operating screen shown in FIG. 18, wherein, in the event that the user instructs joining the documents using the key 2301 shown in FIG. 21, the above-described second processing is executed for each of the multiple jobs, while in the event that the user instructs not joining the documents by not pressing the key 2301 shown in FIG. 21, each of the multiple jobs are consecutively printed form the box, but the above-described second processing is executed only for the jobs which the user desires.

This further enables a setting for deleting the number information for all but one job, for example, in a case wherein multiple jobs are selected but not joined, so that the selection to not delete can be set with the key 401 shown in FIG. 4 only for a single job, the job with the file name 1, from the multiple jobs. As an example, with reference to the job with the file name 1, the job with the file name 4, and the job with the file name 5, the control unit 1108 can follow the settings made by the user so as to output the job with the file name 4 and the job with the file name 5 from the box with the page number information provided thereto beforehand (the old page information already on the documents and the point of being stored in the box) remaining thereupon, and so as to output the job with the file name 1 from the box with the page number information provided thereto beforehand deleted. Output is controlled by the control unit 1108 in the order of selection made in the screen shown in FIG. 18, i.e., in the order of the job with the file name 5 (with the page numbers remaining), the job with the file name 1 (with the page numbers deleted), and the job with the file name 4 (with page numbers remaining).

Thus, enabling handy numbering functions to be executed with the box functions as well broadens the range of user needs which can be handled, and also deals with various user demands.

It should be noted that the concept of outputting from boxes encompasses printing processing with a printer unit, sending to other apparatuses (transmission processing), and storing in another box. The configuration allows the jobs selected with the screen shown in FIG. 18 to be output to the printer with the print start key 2313, transmitted to another apparatus with an unshown key, or saved in a box with an unshown key, under the conditions instructed using the settings screens shown in the FIGS. 20, 21, 22, 3, 4, and 23 (described later).

The settings screen for printing by chapter shown in FIG. 23 is a screen to be displayed on the display unit in the event that the key 2403 for printing pages by chapters shown on the operating screen in FIG. 22 is pressed by the user.

In FIG. 23, reference numeral 2501 denotes a portion for setting the starting chapter number, and 2502 denotes a portion where the currently set chapter number is displayed. In the event that the user returns to the operating screen shown in FIG. 21 and presses the return key 2131 to instruct output in the state that the settings such as shown here have been made, the control unit 1108 effects control regarding the three documents selected in the screen shown in FIG. 18, such that page number data of "1-1" through "1-X" (X being the total number of pages in this job) is sequentially assigned to each of the pages of the job data with the file name 5, page number data of "2-1" through "2-Y" (Y being the total number of pages in this job) is sequentially assigned to each of the pages of the job data with the file name 1, and page number data of "3-1" through "3-Z" (Z being the total number of pages in this job) is sequentially assigned to each of the pages of the job data with the file name 4, and the job with the file name 5, the job with the file name 1, and the job with the file name 4, are output in that order (i.e., the order of selecting the jobs in the screen shown in FIG. 18), as a joined document, i.e., as a single job.

Reference numerals 2503 and 2504 denote increment and decrement keys for changing the settings for the chapter numbers, 2505 denotes a portion for setting the starting page, and 2506 denotes a portion displaying the currently-set page number. Reference numerals 2507 and 2508 denote increment and decrement keys for changing the settings for the page numbers. In the present embodiment, setting the chapter number portion 2502 to "2" and the page number portion 2506 to "3", the first page is printed in order from "2-3", and the first page of the subsequent document is "3-1". The default settings are "1" for both chapter number and page number. This function is used for continuing printing a document that has already been printed partway, starting printing of a document partway through and so forth.

Reference numeral 2509 denotes a settings cancel key used for clearing the settings in this screen and returning to the previous screen, and 2510 denotes an OK key which is used to make the settings in this screen valid and pass therethrough.

Figure 24:
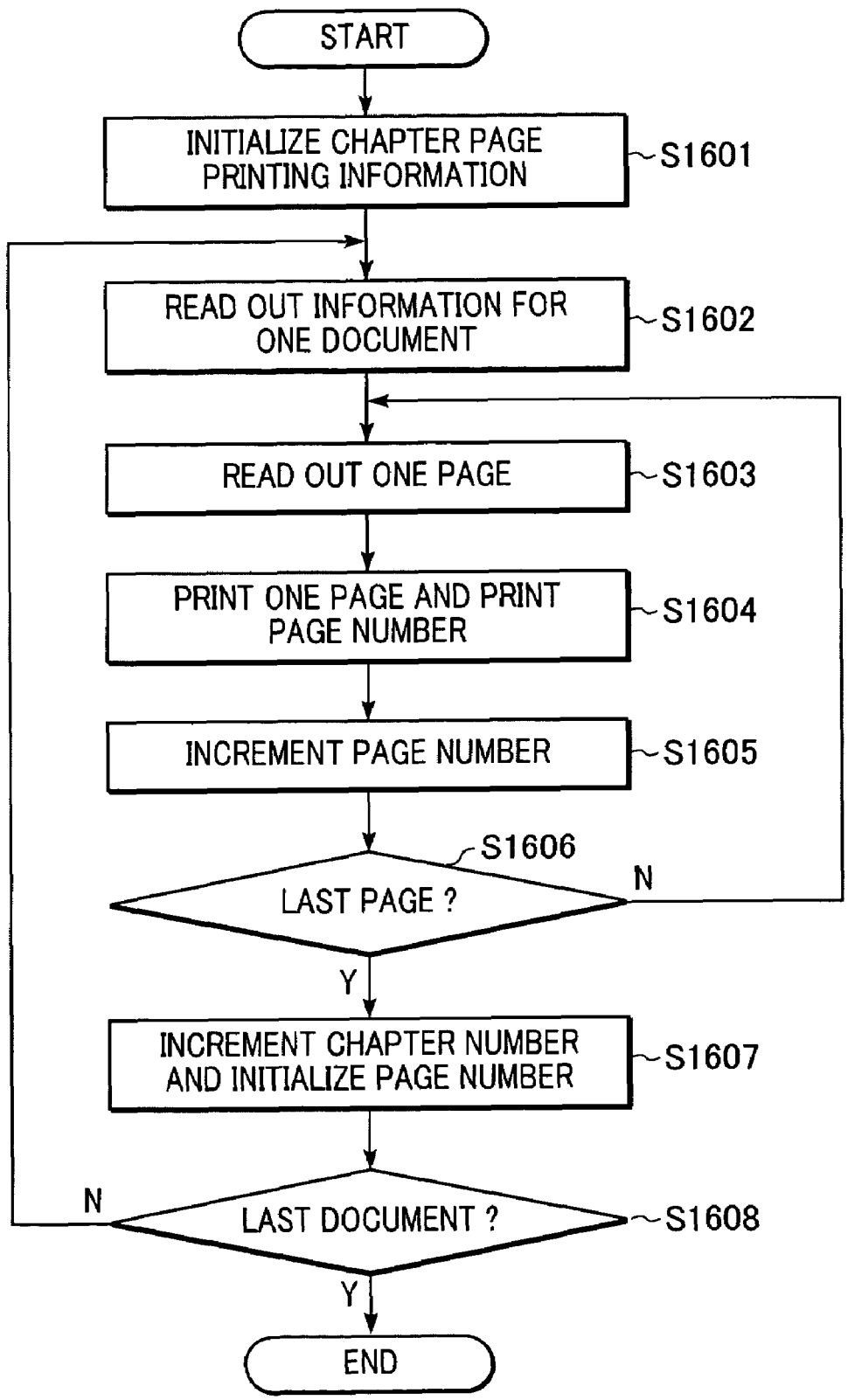
FIG. 24 is a flowchart which shows an example of a third data processing procedure for the image processing apparatus according to the present invention.

FIG. 24 is a flowchart illustrating an example of the third data processing procedures with the image processing apparatus according to the present invention, corresponding to the procedures for printing pages by chapters when printing a joined document. The processing of the steps S1601 through S1608 starts at the point that the print start key 1313 is pressed under the settings for joined printing made with the document joining settings key 2310 shown in FIG. 21.

First, in Step S1601, the settings for printing pages by chapter that have been set are read out on the settings screen shown in FIG. 23, the information for printing pages by chapter such as the starting chapter number and starting page number are initialized, and the flow proceeds to Step S1602 where document information is read out in the order selected with the operating screen shown in FIG. 18.

In Step S1603, one page of page information linked to the document information read out in Step S1602 is read out, and an image corresponding to the page information is read out.

Next, in Step S1604, the chapter number and page number are superimposed on the image read out, which is printed out from the printer unit 1104 in that state. The flow then proceeds to Step S1605 where the page number is incremented.

Whether or not the page read out in Step S1603 is the last page of the document read out in Step S1602 is determined in Step S1606, and in the event that this is determined to be the last page, the flow proceeds to Step S1607; otherwise, the flow returns to Step S1603.

In Step S1607, the chapter number is incremented and the page number is initialized to "1", following which whether or not the document read out in Step S1602 is the final document to be printed is determined in Step S1608, and in the event that this is determined to be the final document, the processing is ended; otherwise, the flow returns to Step S1602.

Thus, combining the joined printing functions for joining multiple documents with the functions for printing pages by chapter with a digital photocopier having box functions allows chapter numbers to be automatically incremented at the time of printer, thereby providing a digital photocopier having a concise way of instructing where to change chapters.

As described above, according to the present embodiment, serially-sorted page numbers can be assigned to pages of an joined document assembled from multiple original document volumes while avoiding a situation wherein both original page numbers and newly-assigned page numbers exist on the pages, thereby markedly improving the ease-of-reading of the page numbers in the joined document. Further, these same advantages can be obtained when using box functions, and the conventional problems can also be avoided in the same way, with processing such as deleting old page numbers and assigning new page numbers being carried out in an appropriate manner, thereby meeting various user needs.

It should be noted that while the present embodiment has been described with reference to an example of handling box function jobs stored in the box area 1502 within a hard disk, the above-described processing control for the various types of numbering processing can be applied to jobs stored in the temporary region 1501 within the same hard disk capable of storing copy function jobs, facsimile function jobs, print function jobs, and so forth. Thus, the same control can be executed with regard to not only box function jobs, but also copy function jobs, print function jobs, and other jobs.

Other Embodiments

The above embodiments have been described with reference to an example wherein the default value for the first page number in a document or chapter is "1", but an arrangement may be made wherein this value can be optionally set by the user, and incremented from this value.

Also, the above embodiments have been described with reference to an example wherein page numbers specified by the user are assigned to and printed on the pages, but an arrangement may be made wherein, in the event that the user makes specifications for printing page numbers outside of the valid printing area of the printer engine, or in the margin of the pages, a warning is given and the user is prompted to redo the settings, or the specified area is automatically avoided and the numbers are provided at valid positions close to the specified position.

Further, the above embodiments have been described with reference to an example wherein original document images are output to sheets matching the sheet size of the original document image, but in the event that the original sizes of multiple original documents are not the same, certain enlarging or reducing processing may be performed to a specified output size for outputting the images.

Further, the above embodiments have been described with reference to an example wherein one page number is assigned to each page to be output, but an arrangement may be made wherein, in the event of document images with multiple columns, for example, multiple page numbers can be specified for each page, and the position of each also specified.

Moreover, the above embodiments have been described with reference to an example wherein the jobs to which the page numbers have been assigned are output as a batch from a single print engine 209 or the like, but in the event that communication is available with an image processing apparatus having equivalent printing functions, various modifications may be made within the range of the present invention wherein jobs appropriated with the serial numbers are distributed among the image processing apparatuses, by transmitting image data with the page information already superimposed on the images, or by transmitting the image data and the page information to be assigned thereto so as to be superimposed thereupon at the receiving image processing apparatus.

Now, a brief description will be given regarding the configuration of the data processing programs readable by the image processing device according to the present invention, with reference to the memory map shown in FIG. 25. FIG. 25 is a diagram illustrating a memory map of a storage medium for storing the various types of data processing programs readable by the image processing apparatus according to the present invention.

Also, while not illustrated in particular, the storage medium also stores information for managing the program group therein, such as version information, author information, and so forth, and may also store information dependent on the operating system or the like of the side reading the program, such as icons for displaying the programs in a recognizable manner.

Further, data accessory to the various types of programs is also managed in this directory. Further, programs for installing these programs in a computer, programs for expanding the programs to be installed in the event that they are compressed, and so forth, may also be stored therein.

Also, the functions shown in FIGS. 9, 15, and 24 with regard to the embodiments may be executed by a host computer using externally-installed programs. In this case, arrangements wherein information or groups of information including the programs are supplied to the output apparatus by storage media such as CD-ROMs, flash memory, floppy disks or the like, or by external storage media via a network or the like, are also encompassed by the present invention.

It is needless to mention that arrangements, wherein the storage medium on which the software program code for realizing the functions of the above-described embodiments has been stored is supplied to a system or apparatus, and the objects of the invention is carried out by the computer (or CPU or MPU) of the system or apparatus reading out and executing the program code form the storage medium, are also encompassed by the present invention.

In this case, the software program code itself read out from the storage medium realizes new functions of the present invention, and the storage medium storing the program code comprises the present invention. Examples of storage mediums which can be used for supplying the program code include floppy disks, hard disks, optical disks, magneto-optical disks, CD-ROMs, CD-Rs, magnetic tape, non-volatile memory cards, ROM, EEPROM, and so forth.

It is also needless to mention that the present invention encompasses cases not only where a computer executing the program code read out realizes the functions of the above embodiments, but also where the program code cooperatively realizes the functions of the above embodiments with the operating system or the like running on the computer.

Further, the scope of the present invention also encompasses arrangements wherein the read-out program code from the storage medium is written to memory provided to function expansion boards inserted in a computer or function expansion units connected to the computer, following which a CPU or the like provided to the function expansion boards or function storing units performs all or part of the actual processing based on instructions of the program code, so as to realize the functions of the above embodiments thereby.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus having reading means for reading individual original documents in an original document volume, for performing image processing on image information read by said reading means, said image processing apparatus comprising:
   storage means capable of storing as jobs a plurality of sets of image information made up of a plurality of pages read by said reading means;
   setting means for setting a joined output mode wherein jobs stored in said storage means are joined and output as one job;
   selecting means for selecting jobs to be joined from the plurality of jobs stored in said storage means in the event that said joined output mode has been set by said setting means;
   number assigning means for assigning serial numbers to be output rot printing the jobs selected by said selecting means; and
   control means for printing each page in the jobs selected by said selecting means, with the serial numbers assigned by said number assigning means.

2. An image processing apparatus having reading means for reading individual original document images within an original document volume, and generating means for generating image information from printing information that is input, for performing image processing on image information read by said reading means, or image information generated by said generating means, said image processing apparatus comprising:
   storage means capable of storing as jobs a plurality of sets of image information made up of a plurality of pages read by said reading means or image information generated by said generating means;
   setting means for setting a joined output mode wherein jobs stored in said storage means are joined and output as one job;
   selecting means for selecting jobs to be joined from the plurality of jobs stored in said storage means in the event that said joining mode has been set by said setting means;
   number assigning means for assigning serial numbers to he output for printing the jobs selected by said selecting means; and
   control means for printing the serial numbers assigned by said number assigning means with a printing unit onto each page in the jobs selected by said selecting means.

* * * * *

UNITED STATES PATENT AND TRADEMARK OFFICE
CERTIFICATE OF CORRECTION

PATENT NO.    : 6,973,274 B2
DATED         : December 6, 2005
INVENTOR(S)   : Yoshiji Kanamoto and Nobuaki Miyahara It is certified that error appears in the above-identified patent and that said Letters Patent is hereby corrected as shown below:

<u>Column 40,</u>
Line 6, "rot" should read -- for --.
Line 31, "he" should read -- be --.

Signed and Sealed this

Sixteenth Day of May, 2006

JON W. DUDAS
*Director of the United States Patent and Trademark Office*